Feb. 10, 1948. H. S. JONES 2,435,940
SAFETY CONTROL SYSTEM FOR FUEL BURNERS
Original Filed July 29, 1941 7 Sheets-Sheet 1
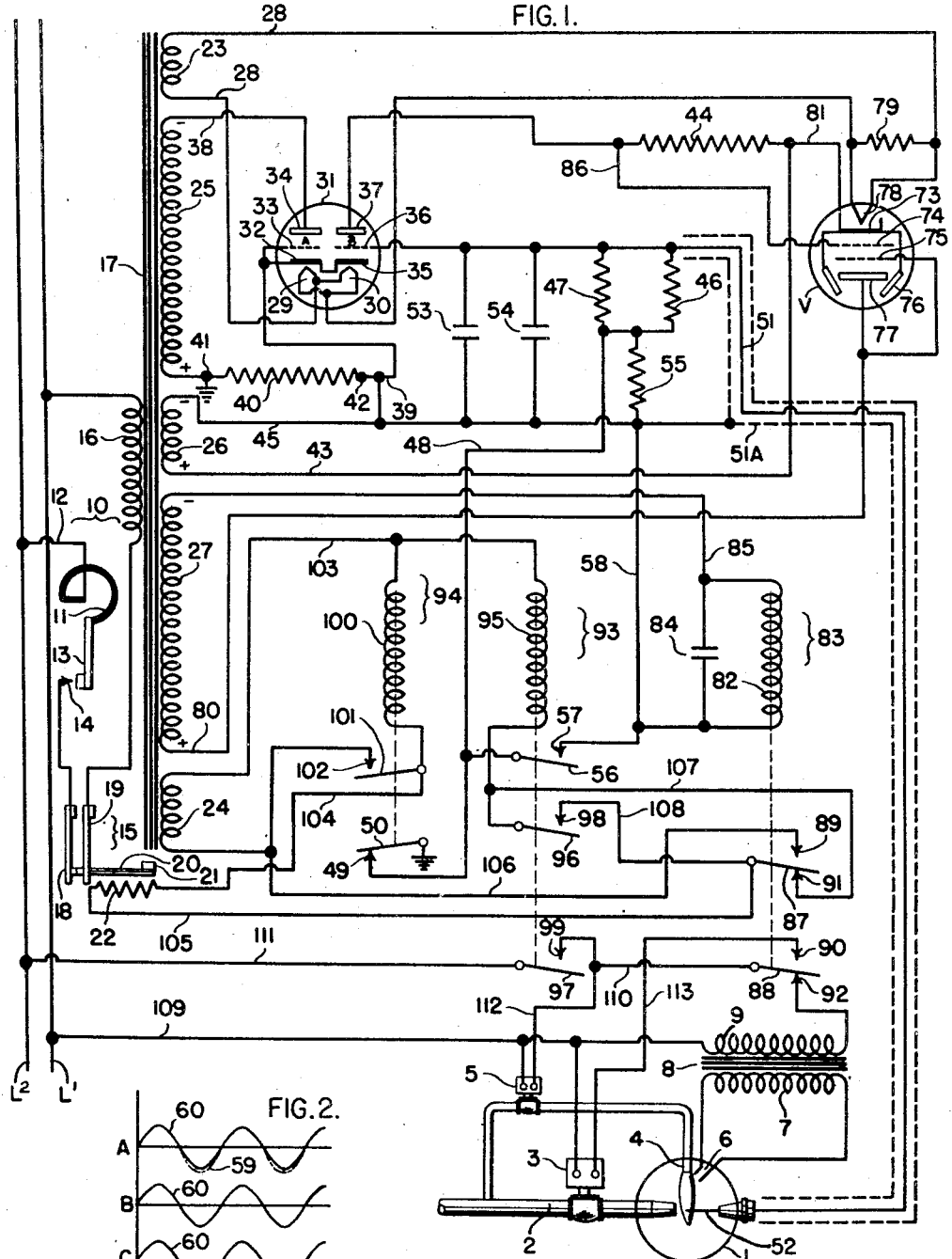
FIG. I.
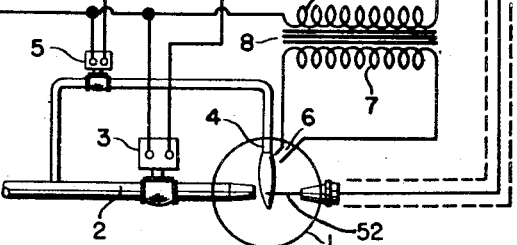
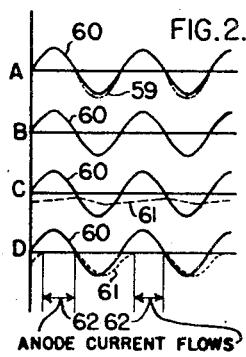
FIG. 2.
ANODE CURRENT FLOWS
INVENTOR.
HARRY S. JONES
BY C. B. Spangenberg
ATTORNEY Feb. 10, 1948. H. S. JONES 2,435,940
SAFETY CONTROL SYSTEM FOR FUEL BURNERS
Original Filed July 29, 1941   7 Sheets-Sheet 2
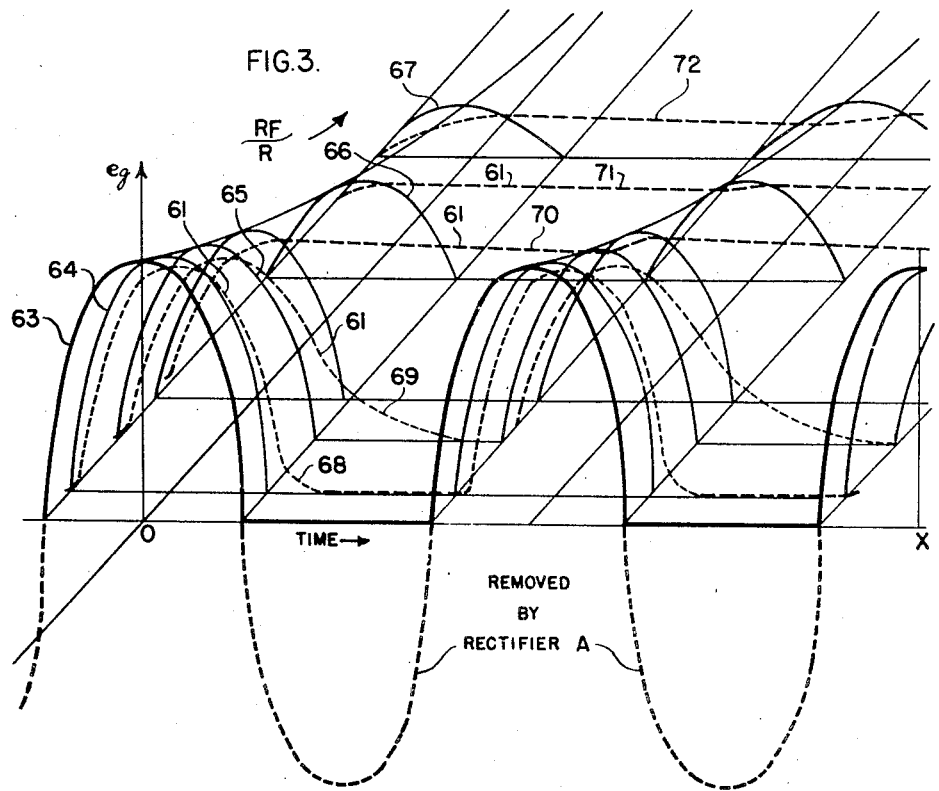
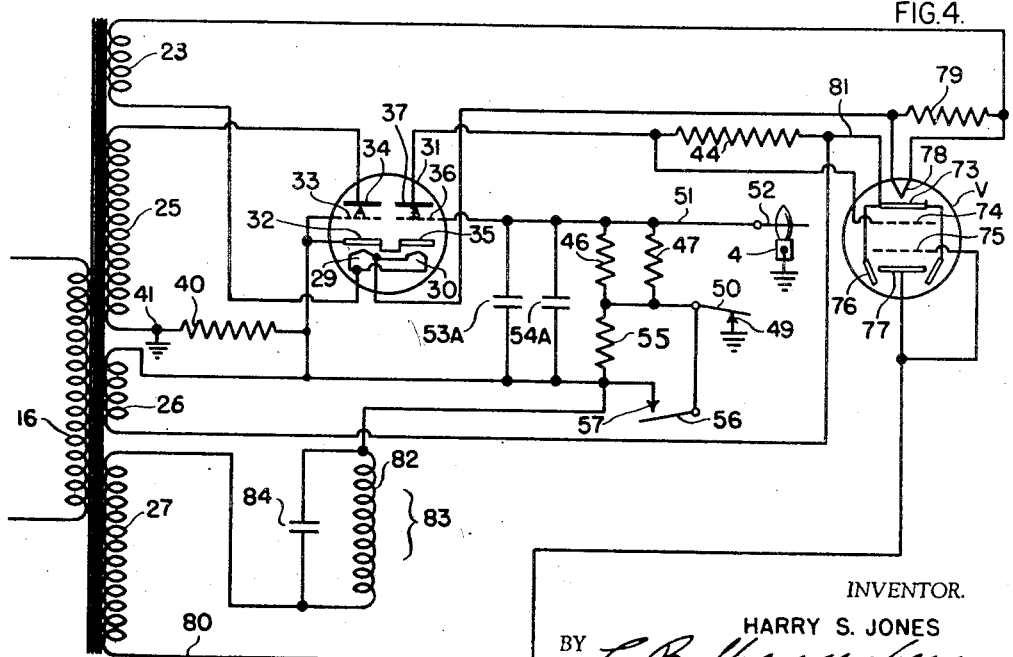
INVENTOR.
HARRY S. JONES
BY
ATTORNEY Feb. 10, 1948.     H. S. JONES     2,435,940
SAFETY CONTROL SYSTEM FOR FUEL BURNERS
Original Filed July 29, 1941     7 Sheets-Sheet 3

INVENTOR.
HARRY S. JONES
BY C. B. Spangenberg
ATTORNEY

Feb. 10, 1948. H. S. JONES 2,435,940
SAFETY CONTROL SYSTEM FOR FUEL BURNERS
Original Filed July 29, 1941  7 Sheets-Sheet 5

INVENTOR.
HARRY S. JONES
BY C. B. Spangenberg
ATTORNEY

INVENTOR.
HARRY S. JONES

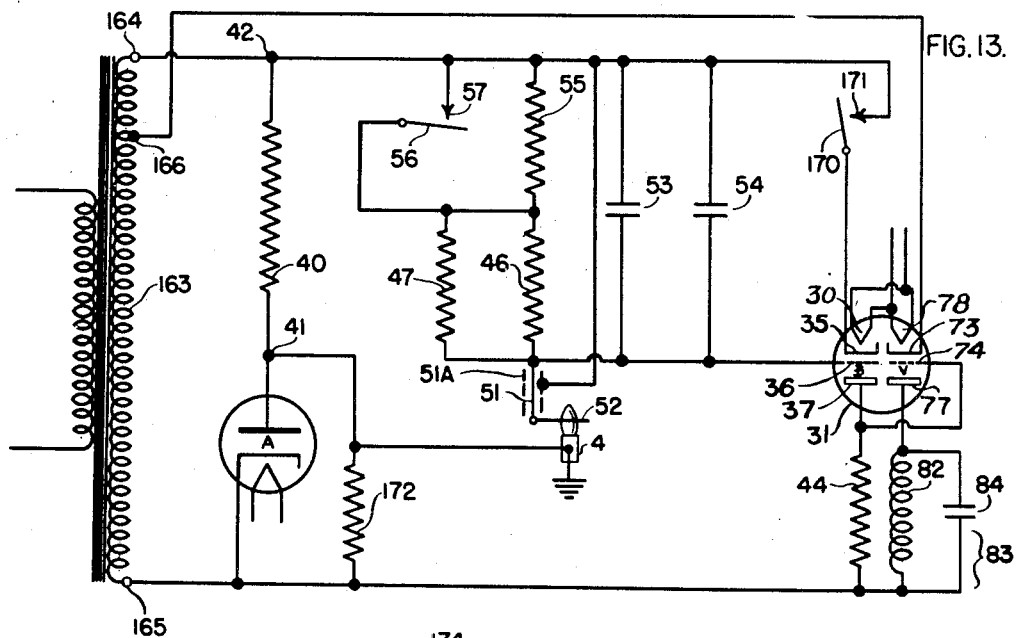
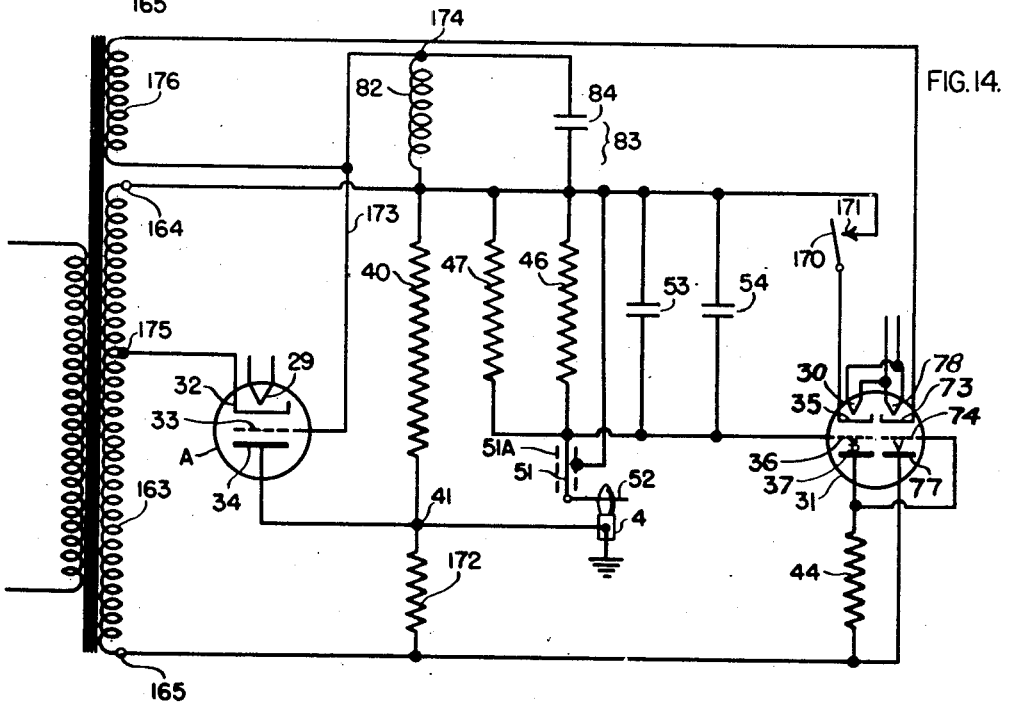

Patented Feb. 10, 1948

2,435,940

UNITED STATES PATENT OFFICE 2,435,940

SAFETY CONTROL SYSTEM FOR FUEL BURNERS

Harry S. Jones, East Orange, N. J., assignor to The Brown Instrument Company, Philadelphia, Pa., a corporation of Pennsylvania Continuation of application Serial No. 404,523, July 29, 1941. This application filed May 17, 1946, Serial No. 670,353

42 Claims. (Cl. 158—28)

The present invention relates to safety control systems for fuel burners and more particularly to safety control systems including means for distinguishing between normal and abnormal conditions of combustion.

A general object of the invention is to provide an improved safety control system for fuel burners that shall operate in accordance with the conductivity of a flame of the burner fuel.

A more specific object of the invention is to provide a safety control system of the flame responsive type for fuel burners and which utilizes an electric discharge device the conductivity of which is changed substantially immediately upon the presence of a flame by utilizing the electrical conductive property of the flame.

A still more specific object of the invention is to provide a safety control system of the flame responsive type for fuel burners and which employs a pair of electrodes one of which may be the burner itself in engagement with the flame for measuring the flame conductivity, and wherein means are provided for distinguishing between normal flame conductivities and apparent conductivities of the path between the electrodes which may be set up due to accidental engagement of the electrodes, or established by virtue of carbonization thereof.

Another object of the invention is to provide an electronic detector circuit responsive to the conditions existing between a pair of electrodes which shall respond in one manner to the presence of a flame and which shall respond in an opposite manner to the absence of a flame or to the presence of a path between the electrodes whose conductance is greater than that of a flame.

Still another object of the invention is to provide such a detector circuit in which the grounded metallic burner tip may be utilized as one electrode and in which the position of the other electrode with respect to the flame is not critical.

Another object of the invention is to provide in an improved flame detector circuit having an electrode adapted to be engaged by the flame means to ensure response of the circuit in a safe sense if the electrode becomes grounded including means to overcome adverse effects due to leakage capacitance in the circuit.

A further object of the invention is to provide an improved safety control system of the flame responsive type which operates in response to a characteristic of a fluctuating current passing through the flame and in which the need for shielding the conductor leading from the system to the flame for appreciable and normal working distances has been eliminated.

Another object of the invention is to provide an improved flame detector circuit which may be supplied with energy from a commercial alternating current supply source and in which the potential for measuring the flame conductivity shall be of a pulsating unidirectional nature.

A further object of the invention is to provide an improved combustion control system for a plurality of fuel fired furnaces wherein means are provided for simultaneously distinguishing between actual conditions of combustion and simulated conditions of combustion in all of the furnaces.

In combustion control systems which have been proposed heretofore, various means have been employed for determining if combustion conditions are proper, and whether combustion actually takes place, one such means comprising an electrode which extends into the flame of the burner and which is so connected in the system as to provide a conductive path of relatively low resistance to ground through the flame. The variation in the electrical conductivity of this path to ground when a flame is present and when a flame is not present is commonly employed to change the bias on the control grid of an electronic valve for controlling a thermal safety switch. Since there is a possibility that a low resistance path may be set up from the electrode to ground through other agencies than by means of the flame, for example, a low resistance path which may be established between the flame electrode and ground by reason of carbonization, by accidental touching of the electrode to ground, or by other abnormal conditions simulating combustion, provisions have been made in devices of the prior art for preventing the fuel supply and ignition from being turned on when such abnormal conditions exist.

Since an abnormal condition of this character simulating combustion may arise after the system is already in operation, means have been provided for distinguishing between such abnormal conditions and normal combustion while the system is in operation. For example, in a thermostatically controlled house heating system, if the control system is insensitive to the presence of the flame after initial ignition of the flame, the fuel feeding means will be operated continuously as long as the room thermostat is closed. If the flame should then be extinguished, the furnace will be flooded with fuel and a highly explosive mixture of the latter will be permitted to accumulate.

As is well known in the prior art all flames are the result of a chemical reaction. In the case of a gas flame, for example, the oxygen of the air combines with the carbon and hydrogen of the gas to form carbon dioxide and water vapor. The flame is always accompanied by ionized particles which are the result of the reaction between the oxygen of the air and the carbon and hydrogen of the gas. These particles or ions are capable of conducting a current between the burner and an electrode inserted in the flame.

With the burner as one electrode and a movable electrode inserted in the flame, it has been determined that the conductivity of a flame is greater in the direction opposite to that of the direction of flame propagation when the movable electrode is held in the outer parts of the flame and that when the movable electrode is moved toward the burner a region is reached where the flame conductivity becomes substantially equal in both directions of current flow between the burner and the movable electrode. By the term "direction of flame propagation" is meant the direction away from the burner. If the movable electrode is moved through this region toward the burner another region is encountered where the conductivity is greater in the direction of flame propagation than in the other direction. This phenomena is believed to be due to the presence of a concentration of positive ions in the base of the flame. The negative ions or electrons of the ionized particles of the flame are much more mobile than the posititve ions and, therefore, tend to accumulate in the outer region of the flame while the positive ions tend to accumulate in the region closely adjacent the burner.

It has been determined further that by suitably biasing the movable electrode positively with respect to the potential of the burner the tendency of the flame to conduct better in the direcion of flame propagation in the region closely adjacent the burner may be overcome and as a result the position of the movable electrode in the frame is then not critical. In commercial fuel burner installations equipped with a safety control system of this type the position of the movable electrode with respect to the flame may change due to accidental displacement of the electrode or to change in the flame size because of changes in fuel supply, drafts and other unpredictable factors, and therefore, an arrangement in which the position of the movable electrode is not critical is particularly advantageous. Therefore, means have been provided in accordance with the present invention to maintain the movable electrode positive with respect to the burner.

In safety control sysems of his type which have been proposed in the prior art and which operate in response to a characteristic of a fluctuating electric current passed through the flame, it has been necessary to employ an electrostatically shielded conductor to connect the flame electrode to the detector circuit in order to maintain the distributed capacitance to ground of the conductor and the movable or flame electrode smaller than a predetermined value. If the distributed capacitance to ground of that conductor and the flame electrode in the prior art arrangements is greater than this predetermined value, the system is rendered unstable or erratic or otherwise unsatisfactory and unsafe in operation.

In accordance with the present invention the need for electrostatically shielding the conductor connecting the flame electrode to the detector circuit has been eliminated by properly proportioning a certain condenser in the detector circuit relatively to the distributed capacitance to ground of the conductor and the flame electrode. Since the difference in the cost of shielded and unshielded cable is appreciable, this feature of my invention is of considerable commercial importance.

Another feature of the present invention is the elimination of undesirable and unsafe effects which may be introduced into the system operation as a result of stray capacitance between certain of the circuit components and ground. For example, when the flame electrode is connected to the control electrode in an electronic valve in a circuit so arranged that the valve is non-conductive under normal flame conditions and should be conductive under abnormal flame conditions, stray capacitance between various of the circuit elements and ground tends to apply a potential on the control electrode of such polarity as to simulate normal flame conditions even when the control electrode is grounded. It may be desirable in some cases that the circuit be so connected that this stray capacitance effect is eliminated or at least minimized to the end that the electronic valve will be operated in a safe sense upon the occurrence of an abnormal condition. Provisions for attaining this end have been made in the device of my present invention.

This application is a continuation of my prior application Serial No. 404,523, filed July 29, 1941, now abandoned.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a wiring diagram illustrating one embodiment of the present invention;

Fig. 2 illustrates the voltage relations in the input and output circuits of the detector circuit of Fig. 1;

Fig. 3 is a three-dimensional curve illustrating in more detail the operation of the detector circuit of Fig. 1 for all values of flame resistance from zero to infinity;

Fig. 4 is a wiring diagram of a modification of the detector circuit of the arrangement of Fig. 1;

Figs. 12 and 13 are wiring diagrams of other modifications of the detector and amplifier circuits of the arrangement of Fig. 1; and Fig. 14 is a wiring diagram of another modification of the detector amplifier circuit of the arrangement of Fig. 1 which may be used when the present invention is applied under severe conditions described hereinafter.

Figure 5:
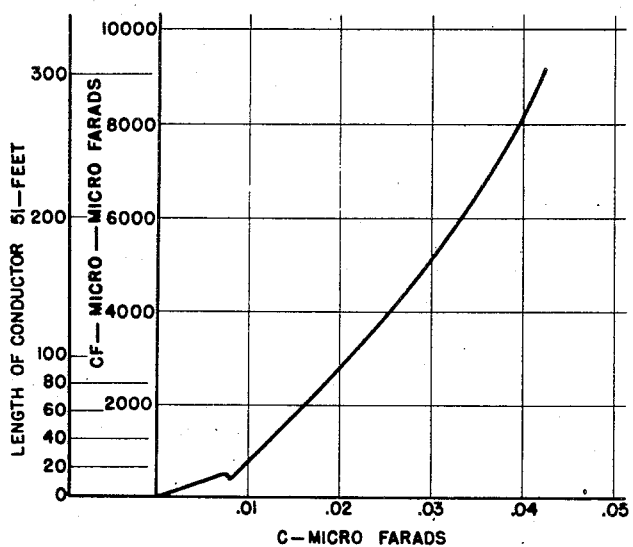
Fig. 5 is a curve showing the maximum distributed capacitance of the conductor connecting the flame electrode and the detector circuit of Fig. 1 and thereby the maximum length of that conductor for a given value of capacitance in the detector input circuit.

Fig. 1 shows a gas burner 1 supplied with gas from a conduit 2 and the flow of gas to the burner is controlled by an electrically operated or other suitable valve 3. A pilot burner 4 is provided which is controlled by an electrically operated or other suitable valve 5, and means are provided for igniting the pilot flame including a pair of electrodes 6 which are connected to the terminals of the secondary winding 7 of an ignition transformer 8 having a primary winding 9 which is adapted to be energized from the alternating current supply lines L¹ and L².

The fuel valve operating circuit of my control system is controlled by means of a thermostat 10 which may be located in a room or space to be heated. The thermostat 10 may be of any suitable construction and includes a bimetallic element 11 connected by means of a conductor 12 to alternating current supply line L², and a contact arm 13 adapted to engage a stationary contact 14 which is connected to alternating current supply line L¹ through a thermal safety switch 15 and the primary winding 16 of a transformer 17.

The thermal safety switch 15 is preferably of the form disclosed in the F. S. Denison Patent 1,958,081 which issued on May 8, 1934. As illustrated more or less diagrammatically in the drawing, this switch comprises a stationary arm 18 and a movable arm 19 which is biased for movement away from the arm 18 but is normally held in engagement with the latter by means of a bimetallic element 20. Bimetallic element 20 is rigidly secured at one end to a stationary block 21 and is arranged to be heated by a coil 22 when the latter is energized through a circuit which will be described hereinafter. Upon energization of coil 22 for a predetermined period of time the bimetallic element 20 will be warped sufficiently in the counter-clockwise direction to permit the arm 19 acting under a spring or other bias to separate from the arm 18 to thereby interrupt the circuit including the thermostat 10 and the transformer primary winding 16. The thermal safety switch 15 will remain locked in this position until manually adjusted to its normal closed position.

The transformer 17 which supplies power for the control system is a combination step-up and step-down transformer and comprises the line voltage primary winding 16, low voltage secondary windings 23 and 24, and high voltage secondary windings 25, 26 and 27. The low voltage secondary winding 23 is connected by conductors 28 to the heater filaments 29 and 30 of an electronic valve 31 and supplies energizing current thereto. The electronic valve 31 is a twin type amplifier valve, for example, a type 6N7, and includes two triodes, designated A and B, in one envelope. For convenience, the triode designated A in the drawing will be referred to hereinafter as the rectifier, and the triode B will be referred to as the detector. The rectifier A includes a cathode 32, a control electrode 33, and an anode 34, and the detector B includes a cathode 35, a control electrode 36 and an anode 37. As shown, the cathodes 32 and 35 are directly connected to each other within the valve 31.

The rectifier A is supplied with electrical energy from the transformer secondary winding 25 through a circuit which may be traced from the upper terminal of winding 25 through a conductor 38, anode 34, cathode 32, and a conductor 39 in which a resistor 40 is inserted to the lower terminal of winding 25. This circuit is conductive only during the half cycles of the alternating voltage supply source when the upper terminal of winding 25 is positive with respect to the lower terminal thereof due to the action of rectifier A. Thus, a pulsating potential drop is produced across resistor 40 in the direction to render terminal 42 of resistor 40 positive with respect to terminal 41 thereof. The control electrode 33 of rectifier A is directly connected to the cathode 32.

The detector B is supplied with electrical energy from the transformer secondary winding 26 through an output circuit which may be traced from the lower terminal of winding 26 through a conductor 43 in which a resistor 44 is inserted, anode 37, cathode 35, and a conductor 45 to the upper terminal of winding 26.

The conductivity of the output circuit of detector B is controlled by an input circuit one branch of which connects the control electrode 36 to the grounded and negative terminal 41 of resistor 40 through a connection including a pair of resistors 46 and 47 which are connected in parallel, a conductor 48, a contact 49 and a switch arm 50, the latter of which is connected to ground. During the normal operation of the system the switch arm 50 is held away from the contact 49 but is in engagement with the latter at certain times for a purpose later described.

A second branch of the input circuit of the detector B connects the control electrode 36 through conductor 51 to an electrode 52 which projects into the flame of the pilot burner 4. The pilot burner 4 is connected to ground.

A third branch of the input circuit of detector B connects the control electrode 36 to the cathode 35 through a parallel connection including condensers 53 and 54 in two branches and resistors 46 and 47, in parallel, connected in series with a resistor 55 in another branch. The resistor 55 is normally shunted by a connection which may be traced from the upper end of resistor 55 through the conductor 48, a switch arm 56, a contact 57 and a conductor 58 to the lower end of resistor 55. The reason for providing two parallel connected condensers 53 and 54 and two parallel connected resistors 46 and 47 is explained hereinafter.

The transformer secondary windings 25 and 26 are so wound on transformer 17 that the detector B is conductive only on the half cycles when the rectifier A is non-conductive and vice versa. Thus, a pulsating direct current potential drop is produced across resistor 40 during the half cycles when the detector B is non-conductive. The phase of this pulsating potential drop is such that it will be at a maximum value when the anode 37 of the detector B is negative, and zero when the anode 37 of detector B is positive, as is illustrated by the dot and dash line 59 in Fig. 2A. In Fig. 2 the anode voltage applied to the detector B is indicated by the solid line 60. The bias potential produced across resistor 40 is indicated by the dot and dash lines 59, and the potential applied between the control electrode 36 and cathode 35 of detector B is indicated by the dotted line 61.

The pulsating potential drop or biasing potential produced across the resistor 40 is applied to the input circuit of the detector B through the flame, if present, and the polarity thereof is such as to cause a pulsating direct current to flow through the flame in the direction opposite to the direction of flame propagation. This input circuit may be traced from the positive terminal 42 of resistor 40, conductor 39, resistor 55 in series with resistors 46 and 47 in parallel shunted by condensers 53 and 54, conductor 51, flame electrode 52, the flame resistance, burner 4 to ground, and through ground to the negative terminal 41 of resistor 40.

When a flame is not present at the burner and the contact 49 and switch arm 50 are out of engagement and no other conductive path exists from the control electrode 36 to ground, no bias potential will be applied to the control electrode 36 of the detector B, as is shown in Fig. 2B. The control electrode 36 of detector B will then be at substantially the same potential as the cathode 35 since the control electrode 36 and cathode 35 are connected by resistors 46, 47 and 55. As a result the detector B will then be conductive during the time its anode 37 is positive.

Upon the appearance of a normal flame, the bias potential produced across resistor 40 is applied to the control electrode 36 through the resistance of the flame. The resulting flow of current through the resistance of the flame produces a potential across resistors 46 and 47 which is stored on the condensers 53 and 54 and is of the proper polarity to apply a negative potential to the control electrode 36 and thereby to reduce the current flow in the output circuit of the detector B. This potential is stored on the condensers 53 and 54 during the half cycle when the rectifier A is conductive and the detector B is non-conductive and is maintained on the condensers 53 and 54 during the succeeding half cycle when the anode 37 is positive, as illustrated by the dotted line 61 in Fig. 2C. This result is accomplished by properly proportioning condensers 53 and 54 and resistors 46 and 47. The result is that little or no current is conducted in the output circuit of detector B during the condition of normal flame.

If a path more conductive than a flame exists between the flame electrode and ground, however, the charge which is stored on the condensers 53 and 54 during the half cycle when the anode 37 is negative will leak off through that conductive path during the same half cycle and the initial portion of the succeeding half cycle, as shown in Fig. 2D, to thereby substantially reduce the potential on the condensers 53 and 54 during the succeeding half cycle. Consequently, the potential applied to the control electrode 36 is rendered substantially less negative, and as a result, current will flow in the output circuit of detector B during the intervals indicated in Fig. 2D by the reference character 62.

It will thus be noted that current flows in the output circuit of the detector B when there is no flame and when the flame electrode 52 is grounded, and that little or no current flows in this output circuit when a normal flame is present at the burner.

In Fig. 3 I have illustrated a three-dimensional curve showing the operation of the detector B for all values of flame resistance from zero to infinity. In Fig. 3 the vertical axis is the negative control electrode to cathode potential of the detector B and has been designated by the reference character $e_g$. The horizontal axis shows the passage of time, and the third axis shows the variation of the flame resistance relatively to the effective resistance of the parallel connected resistors 46 and 47. In Fig. 3 the flame resistance has been designated by the reference character RF and the effective resistance of resistors 46 and 47 has been designated by the reference character R. It will be noted that as the flame resistance RF approaches zero, a condition which exists when the flame electrode 52 is directly connected to ground, the ratio of RF/R approaches the time axis OX.

When the flame resistance is zero the potential $e_g$ which is impressed between the control electrode 36 and cathode 35 of detector B is identical with the potential produced across resistor 40 by the rectifier A. This potential is shown by the heavy, full line 63 in Fig. 3. With the condensers 53 and 54 open-circuited, this potential changes as indicated by the curves 64, 65, 66, and 67, which are shown in the lighter full lines, as the flame resistance increases in magnitude. It will be noted that the amplitudes of curves 63—67 decrease and approach zero as RF increases and approaches infinity. This result occurs because $e_g$ depends upon the factor $$\frac{R}{RF+R}$$

When condensers 53 and 54 are connected into the circuit, these condensers hold part of the peak potential applied to the control electrode 36 between successive half cycles of the potential applied to the flame, as shown by the dotted curves 68, 69, 70, 71, and 72. When the flame resistance RF is very small, the condensers 53 and 54 almost entirely discharge before the next half cycle peak as is illustrated by the curve 68. Above a certain value of the flame resistance RF, however, the condensers 53 and 54 hold substantially all of the peak potential from one half cycle to the next as is shown by the curves 70, 71, and 72. Between half wave peaks of potential across the resistor 40, the control electrode potential $e_g$ thus varies from zero to some peak negative value and down again to a low value as the flame resistance RF varies from zero to the normal flame range of resistance values and to values above the normal flame range, respectively. The low value of $e_g$ when the flame resistance RF is low is caused by the rapid discharge of condensers 53 and 54 through the low value of flame resistance RF. The low value of $e_g$ when the flame resistance RF is very high results from the fact that the peak negative potential applied to the control electrode 36 is then only a very small fraction of the potential produced across resistor 40 inasmuch as this fraction is determined by the ratio $$\frac{R}{RF+R}$$

It should be noted that the actual value of resistance between the flame electrode 52 and ground which will operate to render the detector B conductive depends upon the value of the capacitance of condensers 53 and 54. As the capacitance of condensers 53 and 54 is increased, the "ground out" resistance decreases. The upper resistance limit of resistance at which the detector B is rendered conductive, however, is substantially unaffected by the capacity of condensers 53 and 54 but depends upon the effective value of the parallel resistances 46 and 47. The higher the effective value of the resistors 46 and 47, the higher the upper resistance limit of the flame at which the detector B is rendered conductive.

It is noted that the distributed capacitance along conductor 51 and flame electrode 52 tends to decrease the range of flame resistance to which the detector B is sensitive, and also tends to render the detector B insensitive to the presence or absence of a flame at the burner 4. Most of this effect is produced by the distributed capacitance along the conductor 51 since the flame electrode 52 is ordinarily very short compared to the length of conductor 51. This capacitance to ground varies in direct proportion to the length of conductor 51, and therefore, is different for each installation of a safety control system of this type. That it is necessary to provide some means to minimize this adverse effect will be readily apparent. This end is accomplished in the arrangement of Fig. 1, and has been accomplished in the prior art devices, by electrostatically shielding the conductor 51 by means of a metallic shield 51A. The shield 51A entirely surrounds the conductor 51 and is connected directly to the cathode 35 of detector B. The effect of the metallic shield 51A is to reduce the distributed capacitance of conductor 51 to ground.

With the conductor 51 electrostatically shielded as shown in the arrangement of Fig. 1, there is practically no limit to the length of conductor 51 that may be used since the shield to conductor capacity merely shunts the condensers 53 and 54 and has no other effect on the operation of the detector B than to vary the time delay of operation thereof in response to a change in the condition between the flame electrode 52 and ground. For example, when the total capacitance of the condensers 53 and 54 is 0.02 microfarads, 300 feet of 7 millimeter shielded conductor 51, such as Belden airduct would have no other effect on the operation of the circuit than approximately to double the time delay.

In Fig. 4 I have illustrated more or less diagrammatically a modification of the arrangement shown in Fig. 1 wherein the need for shielding the conductor 51 for appreciable and normal working distances has been eliminated. This advantageous result is attained in Fig. 4 by properly proportioning the total capacitance of condensers 53A and 54A relatively to the distributed capacitance between the conductor 51 and ground.

With the arrangement of Fig. 4 in which the conductor 51 is not electrostatically shielded, there are definite limits to the length of conductor 51 which may be safely used. These limits are such, however, that by proper design the conductor 51 may be of the length required in most, if not all, of the ordinary installations of a safety control system of this type. These limits are determined by the ratio of CF/C, where CF is the distributed capacitance between the conductor 51 and ground, and C is the total capacitance of condensers 53A and 54A. The smaller this ratio CF/C is, the longer the conductor 51 may be, and therefore, this ratio CF/C should preferably equal zero or at least be very small. When the capacitance CF is comparable with the capacitance C, or is larger than the latter, a large negative potential exists on the control electrode 36 and is maintained thereon due to the fact that the capacitance CF, the capacitance C and the resistances 46 and 47 are large. Under this condition the detector B is rendered insensitive to the presence or absence of the flame at the burner and also is unable to distinguish between the normal and abnormal conditions between the flame electrode 52 and ground. This is not a safe condition of operation, and therefore, is highly unsatisfactory. Between these two extremes where the ratio of CF/C is zero, or at least is very small, and where the ratio of CF/C is large, there is a zone of instability, that is, a region wherein the operation of detector B is unstable. In this region of instability, the operation of the detector B is unpredictable and the detector B may or may not respond in a safe sense to the presence or absence of a flame at the burner. Safe operation of the arrangement illustrated in Fig. 4 is attainable only in the range between this region of instability and the extreme where the ratio of CF/C is zero.

In Fig. 5 I have illustrated an experimentally determined curve showing the maximum safe value of CF for a given value of C which may be employed without rendering the operation of the dectector B unstable. Fig. 5 also illustrates the maximum length of unshielded conductor 51 which may be utilized for a given value of C without rendering the detector B unstable in operation.

It is noted that this curve includes a safety factor. That is to say, the maximum value of CF for any value of C may be slightly greater than that indicated by the curve and still allow the circuit to operate safely. For example, for a value of C of 0.01 microfarads (CF may be 0.0013 microfarads instead of approximately 0.0009 microfarads as shown by the curve without rendering the detector B unstable in operation. This operation, however, is somewhat critical, and therefore, for reliable and safe performance the maximum value of CF, and therefore, the maximum length of conductor 51 for a given value of C should not exceed that shown by the curve.

By reference to Fig. 5, it will be seen that the value of C is approximately eleven times as great as the value of CF when C is 0.01 microfarads and that when C is 0.04 microfarads, it is slightly more than five times as great as CF.

It should be noted that the operation of the detector B in the Fig. 4 arrangement is critical and unstable when the value of C is less than approximately 0.0075 microfarads. This is indicated by the peculiar shape of the curve in that region. Therefore, values of C less than 0.0075 microfarads are unsuitable unless the conductor 51 is provided with a shield.

Figure 6:
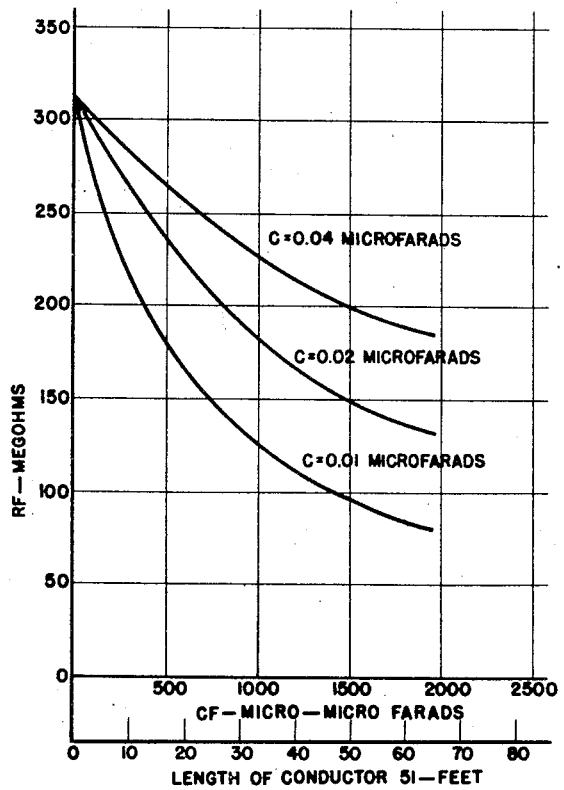
Fig. 6 is a curve showing the relation between the range of flame resistances to which the detector circuit of Fig. 1 is responsive for a given length of conductor connecting the detector circuit with the flame electrode.

The range of flame resistance to which the detector B is responsive is dependent upon the values of the capacitances CF and C. In Fig. 6 I have illustrated three experimentally determined curves showing the relation between the range of flame resistance to which the detector B is responsive for a given value of the capacitance CF when the value of the capacitance C is 0.01, 0.02 and 0.04 microfarads. As is shown by these curves the range of flame resistance to which the detector B is responsive decreases as the capacitance CF increases and increases as the capacitance C increases.

The time required for the detector B to operate in response to the presence or absence of the flame at the burner, or in response to an abnormal condition between the flame electrode 52 and ground, is dependent upon the product of CR, where C is the total capacitance of condensers 53A and 54A and R is the effective resistance of resistors 46 and 47. Accordingly, in choosing particular values of the circuit constants the relative proportions of the capacitance C and the resistance R must be taken into consideration in order to provide proper time delay in the operation of the detector B. Such time delay is desirable in many installations in order to prevent deenergization of the fuel burner control system on extreme and transient fluctuations of the pilot burner flame which may be caused, for example, by opening the furnace door and by fluctuations in the supply of fuel.

It will thus be noted that in the design of a safety control system of the type shown in Fig. 4 in which the conductor 51 is not electrostatically shielded from ground, there are at least four factors which must be taken into consideration. These factors are: (1) stability, and therefore reliability of operation of the detector B, (2) the upper limit of resistance between the flame electrode 52 and ground to which the detector B is to respond, (3) the lower limit or "ground out" resistance between the flame electrode 52 and ground to which the detector B is to respond, and (4) the time delay in the operation of the detector B to a change in the resistance between the flame electrode and ground.

By way of illustration it has been found that a value of 0.01 microfarads for capacitance C, and a value of 25 megohms for the effective resistance of resistors 46 and 47 permits the use of at least 25 feet of unshielded conductor 51 placed within a grounded protective conduit having an inside diameter of one-half inch. With these circuit values, a time delay of approximately one second is obtained. The upper limit of resistance between the flame electrode 52 and ground to which the detector B then responds is approximately 150 megohms and the lower limit or "ground out" resistance between the flame electrode 52 and ground to which the detector B responds is approximately 0.13 megohms.

The arrangement of Fig. 4 with the values of the circuit components noted operates in a reliable and safe manner and may be utilized in the majority of installations of safety control systems of this type. In most installations the length of conductor 51 required does not exceed 25 feet and the upper limit of flame resistance to which the detector B must respond does not exceed 150 megohms. In fact, the resistance of most flames is of the order of 50 megohms. In addition, a value of 0.13 megohms for the lower limit of "ground out" resistance between the flame electrode 52 and ground is satisfactory in most installations and a time delay of approximately one second is also desirable. It will be understood that, if desired, longer lengths of unshielded conductor 51 may be safely used by properly proportioning the capacitance of condensers 53A and 54A relatively to the distributed capacitance between conductor 51 and ground.

As illustrated in Figs. 1 and 4, the current conducted by the detector B controls the potential difference between the terminals of the resistor 44, which potential difference in turn is utilized to control the conductivity of an electronic valve V. The electronic valve V is a power amplifier valve, for example, a type 6V6 and includes a cathode 73, a control electrode 74, a screen grid 75, a beam forming plate 76 which is connected to the cathode 73, an anode 77 and a heater filament 78. For convenience, valve V will hereinafter be referred to as the amplifier.

The heater filament 78 is shunted by a fixed resistance 79, and is connected to the transformer secondary winding 23 through the conductors 28. The parallel connected filament 78 and resistor 79 are connected in series with the parallel connection of heater filaments 29 and 30 of the sections A and B, respectively of the valve 31. The arrangement is such that upon failure of either filament 29 or 30 the current flow through the heater filament 78 will be insufficient to maintain the emission from the cathode 73 and the amplifier V consequently will become non-conductive. This results, therefore, in operation of the system in a safe sense upon failure of any one of the filaments 29 and 30 or 78 since failure of any one of these filaments causes the emission from the cathode 73 to be insufficient.

The amplifier V is supplied with energy from the transformer secondary winding 27 through an output circuit which may be traced from the lower terminal thereof, as seen in Figs. 1 and 4, through a conductor 80, anode 77, cathode 73, a conductor 81, conductor 43, transformer secondary winding 26, conductor 45, conductor 58, a winding 82 of a relay 83 in parallel with a condenser 84, and a conductor 85 to the upper terminal of the transformer secondary winding 27. The condenser 84 is provided across the terminals of the relay winding 82 so that the relay will be maintained energized during the half cycles when the amplifier V is non-conductive to the end that chattering of the relay contacts will be prevented.

The transformer secondary winding 26 is included in this circuit in order to guard against the system operating in an unsafe sense upon accidental opening of that winding. Opening of winding 26 would otherwise tend to cause the amplifier V to become conductive, but with the connection shown and described opening of the winding 26 causes the amplifier V to become non-conductive.

The conductivity of the amplifier V is adapted to be controlled in accordance with the potential drop across resistor 44, and thereby in accordance with the condition of the path between the flame electrode 52 and ground. To this end, one terminal of the resistor 44 is connected to the amplifier cathode 73 by the conductor 81 and the other terminal thereof is connected to the control electrode 74 by a conductor 86. These connections including the resistance 44 are hereinafter termed the input circuit of the amplifier V and are made in such a manner that when current flows through the resistor 44 from the detector B, the amplifier control electrode 74 is biased negatively with respect to cathode 73 by an amount determined by the difference of potential between the terminals of the resistor 44. Therefore, when the detector B is conductive, amplifier V will become non-conductive. Conversely, when detector B is non-conductive, no potential difference will exist across the resistor 44, the potential of the control electrode 74 will then become substantially that of cathode 73, and accordingly, the amplifier V will become conductive.

For convenience of illustration, amplifier V will be referred to as conductive when its output current is sufficient to cause the relay 83 to close its normally opened contacts and as non-conductive when its output current is insufficient for that purpose. Similarly, detector B will be referred to as conductive when its output current is sufficient to cause amplifier V to become non-conductive, and will be referred to as non-conductive when its output current is insufficient to cause the amplifier V to become non-conductive. For further convenience, a contact through which a circuit is completed when a relay is energized will be designated a front contact of the relay, and a contact through which a circuit is completed when the relay is deenergized will be designated a back contact.

As illustrated in Fig. 1, the relay 83 comprises the winding 82 and switch arms 87 and 88 which are controlled by winding 82 and which cooperate with front contacts 89 and 90, respectively. Switch arms 87 and 88 also cooperate with back contacts 91 and 92, respectively. There are also provided two relays 93 and 94 which are utilized for purposes explained hereinafter. Relay 83 comprises a winding 95 which operates switch arms 96 and 97 in addition to the switch arm 56 previously mentioned. The switch arms 96 and 97 cooperate respectively with front contacts 98 and 99. Relay 94 comprises a winding 100 which operates a switch arm 101 in addition to the switch arm 50 previously mentioned. The switch arm 101 cooperates with a front contact 102.

When the temperature of the space to be heated is higher than the desired value, all parts of the system are in the positions shown in Fig. 1 and the fuel burner is then deenergized. If the temperature of the room or space to be controlled falls below the value it is desired to maintain, the thermostat 10 operates to move the switch blade 13 into engagement with the contact 14. This results in closure of an energizing circuit to the transformer primary winding 16 and thereby effects energization of the transformer secondary windings.

The detector B is not immediately rendered conductive, however, because the switch arm 50 and contact 49 are then in engagement and operate to apply the full negative potential across the resistor 40 to the control electrode 36. Therefore, as soon as the filament 78 of the amplifier V becomes heated, the amplifier V becomes conductive and energizes the winding 82 of relay 83. The relay 82 then operates switch arm 87 into engagement with the front contact 89 to complete an energizing circuit for the winding 100 of relay 94 in series with heater coil 22 of the thermal safety switch 15. This circuit may be traced from the upper terminal of transformer secondary winding 24 through a conductor 103, winding 100, a conductor 104, heater coil 22, a conductor 105, switch arm 87, contact 89, and a conductor 106 to the lower terminal of winding 24.

The energization of winding 100 causes the switch arm 101 to close on the front contact 102 to complete a holding circuit for the winding 100. This holding circuit may be traced from the upper terminal of winding 24, through conductor 103, winding 100, switch arm 101, and contact 102 to the lower terminal of winding 24. Winding 100 when energized also actuates switch arm 50 out of engagement with contact 49 thus opening the circuit which applies the negative potential to the control electrode 36 of detector B, and thereby permitting the detector B to become conductive providing conditions between the flame electrode 52 and ground are proper.

Before the starting cycle is allowed to proceed further, however, a check is made to detect the presence of leakage resistance paths between the electrode 52 and ground, and initiation of the burner flame is prevented in a manner described hereinafter if such leakage paths exist and are of the order of a normal flame resistance or slightly higher, as desired. This desirable feature is obtained by an interlocking of the relays 83 and 94 to the end that the cycle can not proceed further until the relay 83 has been deenergized and then reenergized. If the resistance of the path between the flame electrode 52 and ground is of the order of a normal flame, a charge is stored on the condensers 53 and 54 which maintains the detector B non-conductive and consequently maintains the amplifier V conductive whereby the relay 83 is not deenergized.

The resistor 55 which is connected in series with the resistors 46 and 47 in parallel between the control electrode 36 and cathode 35 of detector B is provided to accomplish this result. At this point of the starting cycle of the system it will be noted that the shunt circuit around the resistor 55 is open at the switch arm 56. The resistor 55, therefore, is now effectively connected in the input circuit of the detector B and operates to place a higher resistance in shunt with the condensers 53 and 54, and therefore, a higher average negative potential is maintained on the control electrode 36 by the condensers 53 and 54 than would be maintained thereon if the resistance 55 were shunted out. The detector B at this point in the starting cycle of the system is therefore sensitive to conductive paths between the electrode 52 and ground of resistance greater than that of a normal flame. If such conductive paths exist, the detector B will remain non-conductive and the system will continue in the condition last described, namely with the relays 83 and 94 energized. The magnitude of the resistance of such leakage conductive paths from electrode 52 to ground to which the detector B is sensitive is determined by the total capacitance of the condensers 53 and 54 and the effective value of the resistances 46, 47 and 55.

If no such leakage conductive paths exist between the flame electrode 52 and ground, however, no potential is stored on condensers 53 and 54, and accordingly, detector B becomes conductive causing the amplifier V to become nonconductive and the relay 83 to be deenergized. This causes switch arm 87 to close back contact 91 to thereby complete an energizing circuit for the winding 95 of relay 93. This energizing circuit may be traced from the upper terminal of transformer secondary winding 24 through conductor 103, winding 95, a conductor 107, contact 91, switch arm 87, conductor 105, heater coil 22, conductor 104, switch arm 101, and contact 102 back to the winding 24.

Energization of the relay 93 causes it to close a holding circuit for itself, causes it to shunt the resistor 55, and causes it to energize the ignition transformer primary winding 9 and the pilot fuel valve 5. The holding circuit for the relay 93 may be traced from the transformer secondary winding 24, through conductor 103, winding 95, switch arm 96, a conductor 108, conductor 105, heater coil 22, conductor 104, switch arm 101 and contact 102 back to winding 24. The resistor 55 is shunted by the closure of switch arm 56 on front contact 57 through the conductors 48 and 58. The energizing circuit for the ignition transformer primary winding 9 may be traced from the alternating current supply line $L^1$ through a conductor 109, the primary winding 9, contact 92, switch arm 88, a conductor 110, contact 99, switch arm 97, and a conductor 111 to the alternating current supply line L². The energizing circuit for the pilot fuel valve 5 may be traced from the supply line L¹ through conductor 109, valve 5, a conductor 112, contact 99, switch arm 97 and conductor 111 to the supply line L².

As a result of the energization of the ignition transformer 8 and the pilot fuel valve 5, a flame should appear at the pilot burner 4. If no flame appears no further action will take place until the system is deenergized by the action of the heater coil 22 on the thermal safety switch 15. If a flame appears, however, detector B will become non-conductive as previously described, and consequently, amplifier V will become conductive and relay 83 will again be energized.

Reenergization of relay 83 causes the closure of a short circuit around the heater coil 22, opening of the energizing circuit through the ignition transformer primary winding 9, and energization of the main fuel valve 3. The burner 1 is then in full operation. The short circuit around the heater coil 22 may be traced from the left end thereof as seen in Fig. 1 to conductor 105, switch arm 87, contact 89, conductor 106, contact 102, switch arm 101 and conductor 104 to the other end of heater coil 22. The energizing circuit of transformer primary winding 9 is opened by the movement of switch arm 88 away from the back contact 92. The energizing circuit to the main fuel valve 3 may be traced from the supply line L¹ through conductor 109, fuel valve 3, a conductor 113, contact 90, switch arm 88, conductor 110, contact 99, switch arm 97 and conductor 111 to the supply line L².

If, after the burner has been placed in full operation, the flame should become extinguished, the detector B will become conductive, amplifier V will become non-conductive and relay 83 will be deenergized, thus causing the main burner valve 3 to close, effecting reenergization of the ignition transformer 8, and causing opening of the shunt circuit around the heater coil 22 of the thermal safety switch 15. If the flame then reappears, the burner will go again into full operation. If the flame does not reappear within a predetermined time, however, the system will be deenergized by the opening of the thermal safety switch 15 due to the action of the heater coil 22.

From the foregoing it will be seen that the system of Fig. 1 is adapted to distinguish between normal flame conditions and abnormal conditions at the burner 4 and operates to deenergize the system if an abnormal condition prevails longer than a predetermined time.

As illustrated in Figs. 1 and 4, two condensers of one-half the nominal value required for the capacitance C are provided to reduce the possibility of unsafe failure of the system due to open circuiting of the capacitance C. Thus, in the arrangement of Fig. 4, the value of capacitance C may desirably be so chosen that when it is reduced to one-half its nominal value due to open circuiting of one condenser 53A or 54A, the circuit will still fail safe upon flame failure or upon direct connection of the flame electrode with ground when twenty-five feet of unshielded cable in one-half inch flexible and grounded conduit is used.

The two parallel connected resistors 46 and 47 are each double the value required for resistance R and are provided to reduce the possibility of unsafe failure of the system in case one resistor is open circuited.

Figure 7:
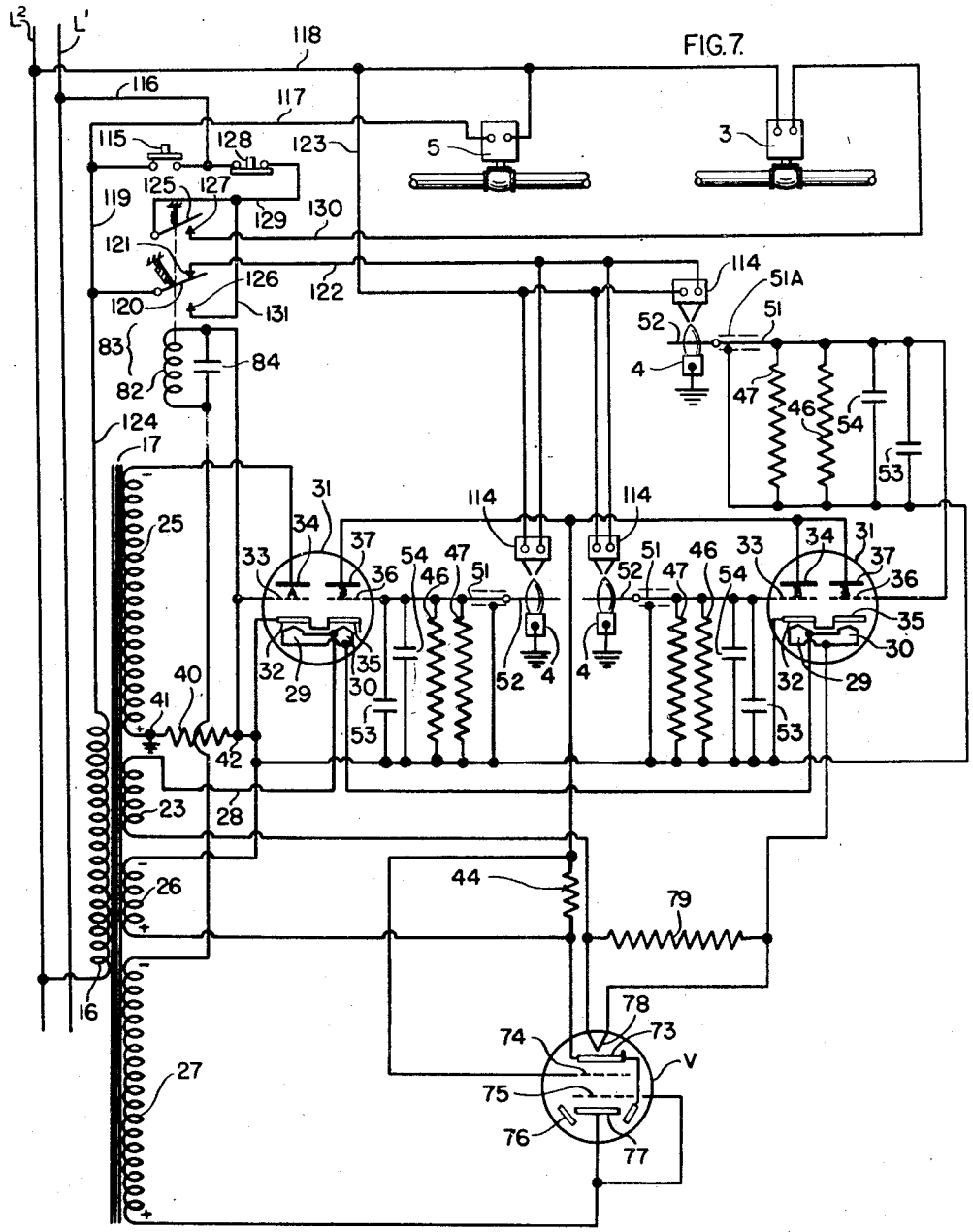
Fig. 7 is a wiring diagram illustrating a modification of the arrangement of Fig. 1 in which the combustion conditions in a plurality of burners may be controlled by means of a single control system.

In Fig. 7 I have illustrated more or less diagrammatically a modification of the arrangement illustrated in Fig. 1 which may be employed in checking the combustion conditions of a plurality of fuel burners simultaneously. The circuit arrangement illustrated in Fig. 7 will operate upon flame failure, or upon the occurrence of an abnormally low resistance path to ground from any one of the flame electrodes associated with the respective burners due to accidental shorting or carbonization or for any other reason, to close the main fuel supply valve or to maintain said fuel valve closed if any one of the burners fails to ignite.

In Fig. 7, in order to avoid confusion of the drawing, I have shown an arrangement responsive to the combustion conditions of only three fuel burners, but it will be understood that more fuel burners may be so controlled from a single unit if desired.

In the arrangement of Fig. 7 it will be understood that the circuit components for the input circuits of the various detector units B may be so designed as to permit the use of unshielded conductors between the detector units and the flame electrodes associated therewith as described in connection with Fig. 4, or if desired, those conductors may be provided with shields as illustrated in connection with Fig. 1.

Although it will be understood that the flame responsive units of Fig. 7 may be employed in conjunction with the control relay system of Fig. 1, I have for purposes of simplification shown this form of my invention as adapted to be employed in conjunction with manually lighted burners. Thus, in Fig. 7 the pilot and main burner flames are manually lighted, and after combustion has taken place, the system operates so as to maintain the pilot and main burner fuel valves in open position so long as normal conditions of combustion exist.

As illustrated the arrangement of Fig. 7 includes a plurality of ignition transformers 114 each of which is associated with a respective pilot burner 4 and is adapted to be energized together with the pilot valve actuating means upon closure of a normally open push button 115. The energizing circuit for the pilot valve may be traced from the alternating current supply line L¹ through a conductor 116 to the push button 115, conductor 117, the pilot valve 5, and conductor 118 to the supply line L². The energizing circuit for the ignition transformers 114 may be traced from the supply line L¹, conductor 116, push button 115, a conductor 119, a switch arm 120, contact 121, a conductor 122, the primary windings of the ignition transformers 114 which may desirably be connected in parallel, and conductors 123 and 118 to the supply line L². The energizing circuit for the transformer primary winding 16 may be traced from the supply line L¹ through conductor 116 to push button 115, conductors 119 and 124 and the primary winding 16 to the supply line L².

Thus, when the push button 115 is closed the pilot valve 5 is opened, the ignition transformers 114 are energized, and the transformer primary winding 16 is energized. As soon as a pilot flame appears at any of the burners, the detector B associated therewith is rendered non-conductive. The output circuits of all of the detectors B are connected in parallel and this parallel connection is connected in series with the resistor 44 and the transformer secondary winding 26. In this arrangement as in the Fig. 1 arrangement, the resistor 44 is connected in the input circuit of the amplifier V in such manner that when all of the detectors B are non-conductive the amplifier V will be conductive but when any one of detectors B or all of them are conductive the potential drop produced across the resistor 44 by the current conducted by the detectors is sufficient to render the amplifier V non-conductive.

The detectors B are each operatively associated with a separate pilot burner 4 and operate in the manner described in connection with Fig. 1 or Fig. 4, depending upon whether a shielded conductor 51 is utilized or not, so that the rendering of the detectors B non-conductive upon the appearance of a flame at each of the pilot burners results in the amplifier V being rendered conductive and thereby in energization of the relay 83.

In the arrangement of Fig. 7 the relay 83 is adapted to actuate a switch arm 125 and the switch arm 120 already mentioned. When the relay 83 is deenergized, the switch arm 120 is in engagement with the contact 121, and when the relay 83 is energized, the switch arms 120 and 125 are moved into engagement with contacts 126 and 127, respectively.

The switch arm 125 and contact 127 are included in an energizing circuit to the main valve 3 so that energization of the relay 83 results in the establishment of a circuit for actuating the main fuel valve 3 to its open position. This circuit may be traced from the supply line L¹, conductor 116, a normally closed push button 128, a conductor 129, switch arm 125, contact 127, a conductor 130, main valve 3, and conductor 118 to the supply line L². The switch arm 120 and contact 126 are included in the energizing circuit to the pilot valve 5 independent of the push button energizing circuit so that energization of the relay 83 results in the establishment of a holding circuit for the pilot valve which may be traced from the supply line L¹, conductor 116, push button 128, conductor 129, a conductor 131, contact 126, switch arm 120, conductor 119, conductor 117, pilot valve 5, and conductor 118 to the supply line L². The switch arm 120 and contact 126 are also included in the energizing circuit to the transformer primary winding 16 which is independent of the push button energizing circuit so that energization of the relay 83 results in the establishment of a holding circuit for the transformer primary winding 16. This circuit may be traced from the supply line L¹ through conductor 116, push button 128, conductor 129, conductor 131, contact 126, switch arm 120, conductor 124, and the transformer primary winding 16 to the supply line L². Furthermore, it will be noted that when the relay 83 is energized the energizing circuit to the ignition transformers 114 is interrupted and thereby the ignition transformers are deenergized as a result of separation of the switch arm 120 and the contact 121. The normal operating condition of the arrangement of Fig. 7 having thus been established the push button 115 may subsequently be released.

The system will then continue to operate since the conditions of combustion are proper so long as it is desired to maintain the burners in operation. For interrupting the energizing circuit to the pilot and main fuel valves when it is desired to shut down the system, means have been provided in the form of the normally closed push button 128. The push button 128 operates when actuated so as to result in closure of the pilot and main fuel valves thereby shutting off of the supply of fuel to the various burners and in deenergization of the transformer primary winding 16.

As soon as one of the pilot flames is extinguished, the corresponding detector B becomes conductive and the amplifier V is rendered non-conductive whereupon the relay 83 is deenergized. This results in separation of the switch arms 120 and 125 from their respective contacts 126 and 127. If thereafter, the push button 128 is released and later closed, the system will remain deenergized until the push button 115 is closed.

If while the system is in operation one of the electrodes 52 should be accidentally connected to ground through an abnormally low resistance by reason of carbonization or for any other reason, the detector unit individual thereto will immediately detect this condition and operate to cause deenergization of the entire system. The operation of each of the detectors B upon the occurrence of such an abnormal condition is identical with that described in connection with either Fig. 1 or Fig. 4 and hence need not be described in detail.

Figure 8:
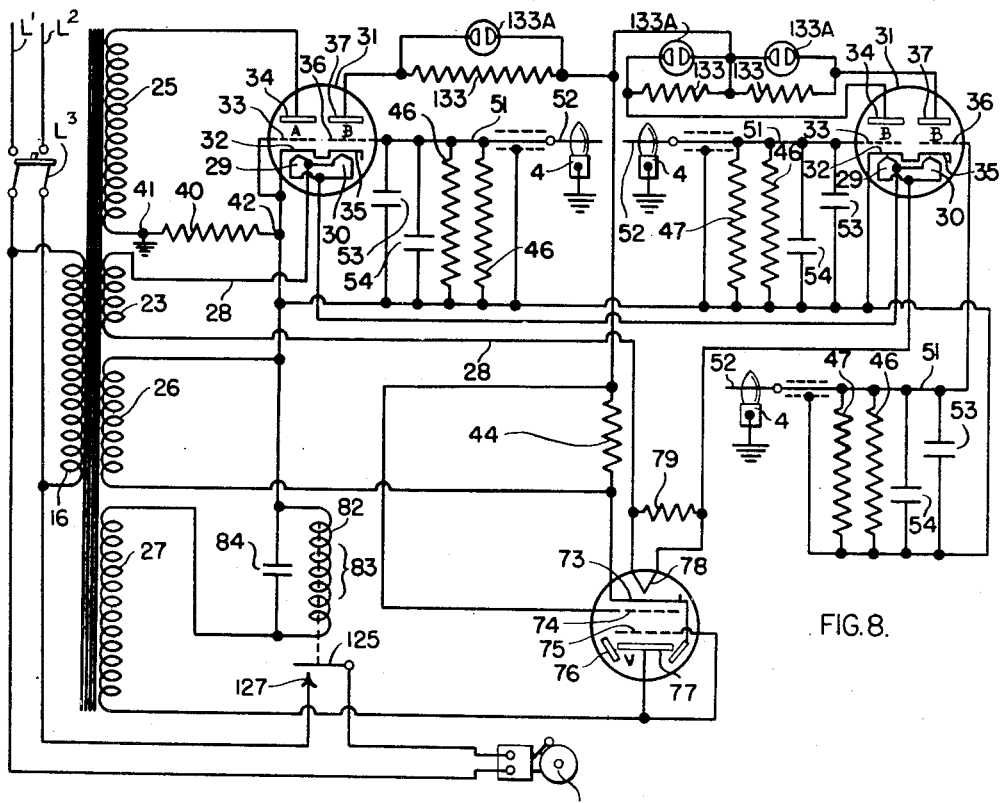
Fig. 8 illustrates a modification of the arrangement of Fig. 7.

In Fig. 8 I have illustrated more or less diagrammatically a modification of the arrangement shown in Fig. 7 which has the particular utility in indicating the location of the burner at which an abnormal condition of combustion has arisen. The arrangement of Fig. 8, for purposes of simplification of the drawings, has been shown as adapted to be employed in conjunction with manually lighted burners, and has not been shown in conjunction with a control system as in the arrangement of Fig. 7, but instead has been shown as being adapted to actuate an audible alarm, such as a bell 132, upon the occurrence of an abnormal condition of combustion at any of the burners.

In order to facilitate the determination of the location of the burner at which an abnormal condition of combustion exists, means have been provided in this arrangement in the form of a resistor 133 and a neon lamp 133A in shunt therewith in the output circuits of each of the detectors B. Thus, when the detector B associated with the burner at which an abnormal condition of combustion exists is rendered conductive as a result of such abnormal condition, the flow of output current from that detector B through the resistor 133 associated therewith produces a potential drop across the resistor 133 of sufficient magnitude to cause the neon lamp 133A individual thereto to flash. It will be apparent that the provision of such signalling means facilitates the determination of which burner is at fault.

In this arrangement the supply of energizing current to the flame detector circuits is controlled by means of a manually operable switch L³ which is connected between the supply lines L¹ and L² and the input circuit of the flame detector circuits. The audible indicating means or bell 132 is adapted to be connected to the supply lines L¹ and L² through the switch L³ upon the closure of switch arm 125 upon contact 127. When a normal condition of combustion exists at all of the burners, the switch arm 125 is held away from the contact 127 by the relay 83 which is then energized, but upon the occurrence of flame failure or any other abnormal condition of combustion at any one of the burners, the relay 83 is deenergized whereupon the switch arm 125 is actuated into engagement with the contact 127 to close the energizing circuit for bell 132. Energization of bell 132 thus audibly indicates to an attendant that an abnormal condition exists at one of the burners and the attendant by noticing which one of the neon lamps 133A is flashing can readily determine which burner is at fault.

Figure 9:
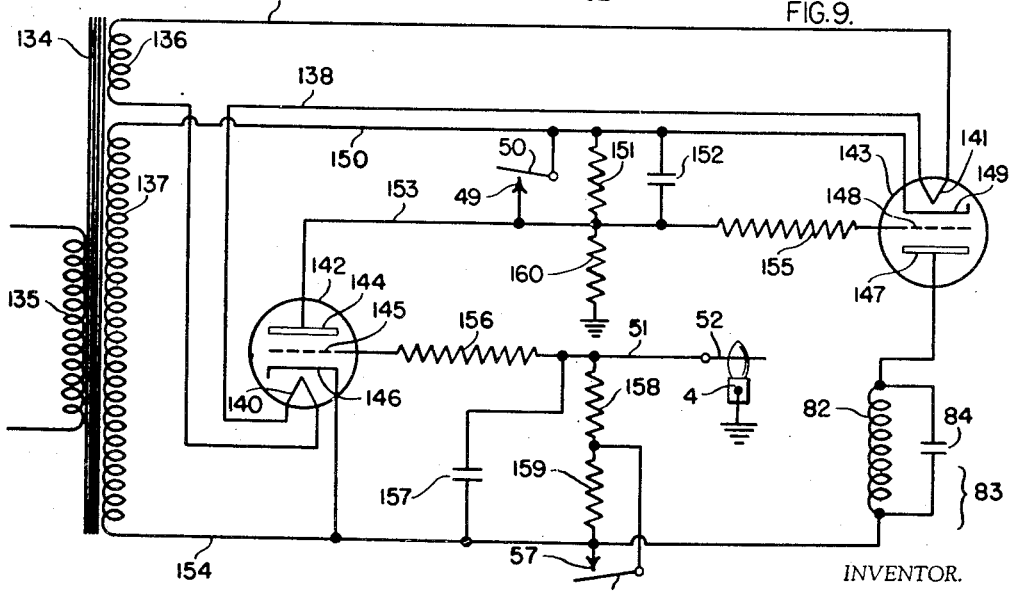
Fig. 9 is a wiring diagram of another modification of the detector circuit of the arrangement of Fig. 1.

In Fig. 9 I have illustrated more or less diagrammatically another modification of the arrangement of Fig. 1 wherein the use of a shield 51A for electrostatically shielding the conductor 51 from ground may be dispensed with and an unshielded conductor 51 utilized instead. More specifically, in Fig. 9 I have illustrated a different form of flame detector circuit which may be utilized and to which the present invention may be adapted to eliminate the need for electrostatically shielding the conductor 51.

In Fig. 9 electrical energizing current for the detector and amplifier circuit is obtained from a transformer 134 which is a combination step-up and step-down transformer comprising a line voltage primary winding 135, a low voltage secondary winding 136 and a high voltage secondary winding 137. The low voltage secondary winding 136 is connected by conductors 138 and 139 to the heater filaments 140 and 141 of a pair of electronic valves 142 and 143, respectively. The electronic valve 142 is a triode of any suitable type and functions in this circuit as a detector. The electronic valve 143 is a triode of the type commonly known as a power amplifier valve. The detector 142 includes an anode 144, a control electrode 145, a cathode 146, and the heater filament 140. The amplifier valve 143 includes an anode 147, a control electrode 148, a cathode 149, and the heater filament 141.

The anode circuit of the detector 142 is supplied with alternating voltage from the transformer secondary winding 137 through a circuit, hereinafter termed the output circuit, which may be traced from the upper terminal of the transformer secondary winding 137 through a conductor 150, a resistor 151 which is shunted by a condenser 152, a conductor 153, the anode 144, the cathode 146, and a conductor 154 to the lower terminal of the winding 137. In this arrangement the switch arm 50 and contact 49 are arranged to shunt resistor 151 and condenser 152 for initially permitting the relay 83 to become conductive upon closure of the thermal safety switch blade 13 with contact 14.

The detector 142 is connected to the transformer secondary winding 137 in such a manner that it may conduct current only during those half cycles in which the upper terminal of the transformer winding 137 is positive with respect to the lower terminal, while the amplifier 143 is connected to the transformer secondary winding 137 so that it may conduct only during alternate half cycles, that is, when the lower terminal of the winding is positive with respect to the upper terminal. The control electrode 148 of the amplifier 143 is normally connected to the cathode 149 through an input circuit including a protective resistor 155, and resistor 151 and condenser 152 in parallel. When the detector 142 is conductive, a potential drop exists across the resistor 151, a charge is built up on the condenser 152, and the control electrode 148 is maintained at a negative potential with respect to the cathode 149. The condenser 152 and the resistor 151 are so proportioned that several cycles must elapse before the charge built up on the condenser can leak off through the resistor. Therefore, the control electrode 148 is maintained at a negative potential with respect to the cathode 149 throughout the complete cycle, and accordingly, the amplifier 143 may not conduct sufficient current to energize the winding 82 of the relay 83. Conversely, when the detector 142 is non-conductive, or carrying little if any current, the potential drop across the resistor 151 will be small, any charge on the condenser 152 will leak off after a few cycles and the control electrode 148 will be at the same potential as the cathode 149. As a result, the amplifier 143 will conduct sufficient current to energize the winding 82 of relay 83.

It will be apparent that the amplifier 143 responds inversely to the condition of detector 142, that is, when the detector conducts a large current the amplifier conducts a small current and vice versa, as in the arrangements of Figs. 1 and 4.

The control electrode 145 of the detector 142 is connected through a protective resistance 156 and conductor 51 to an electrode 52 which is insulated from the burner 4 and extends into the pilot flame as in the previous arrangements described. The conductor 51 is connected to the conductor 154 through a parallel circuit including a condenser 157 and two resistors 158 and 159 connected in series. A circuit including the switch arm 56 and contact 57 of the Fig. 1 arrangement is provided for shunting the resistance 159. The resistor 159 in this arrangement as in the arrangement of Fig. 1, is provided for initially checking the resistance of the circuit path between the flame electrode and ground for the presence of leakage conductive paths. In the arrangement of Fig. 9 when a flame is established at the pilot burner 4 a circuit is established which may be traced from the upper terminal of the transformer secondary winding 137 through conductor 150, resistor 151 and condenser 152 in parallel, a protective resistor 160 to ground, the pilot burner 4, the flame resistance, electrode 52, conductor 51, condenser 157 and resistance 158 in parallel, switch arm 56, contact 57, and conductor 154 to the lower terminal of winding 137. Resistor 159 is shunted out of this circuit through closure of switch arm 56 on contact 57 when a flame is present at the burner 4.

Due to the rectifying property of the flame a charge will be stored on the condenser 157 of the proper polarity to apply a negative potential on the control electrode 145 relatively to the potential of the cathode 146. This reduces the output current of the detector 142 sufficiently so that the amplifier 143 becomes conductive to thereby effect energization of the relay 83.

If the flame should become extinguished while the arrangement of Fig. 9 is in operation, the conductive path between electrode 52 and ground will be removed and the control electrode 145 will tend to assume the potential of the cathode 146 making the detector 142 conductive. This will cause the amplifier 143 to become non-conductive, thus deenergizing the relay 83.

If the electrode 52 should accidentally be connected to ground through a low resistance path, the detector 142 will be made conductive since the control electrode 145 will then be at substantially the same potential as the anode 144. This will cause the amplifier 143 to become non-conductive, thus deenergizing the relay 83.

By properly proportioning the capacitance of condenser 157 and the resistance of resistor 158 relatively to the length of the conductor 51 in the manner described in connection with Fig. 4, an unshielded conductor 51 may be utilized. When the circuit components 157 and 158 are thus properly proportioned relatively to the length of conductor 51, the adverse effects of the distributed capacitance along the length of the conductor 51 are obviated and the circuit arrangement of Fig. 9 is adapted to give reliable and safe operation in response to the conditions of combustion at the pilot burner.

It is noted that with the circuit arrangement dscribed in Figs. 1 and 4 the occurrence of leakage capacity effects between either or both of the transformer secondary windings 26 and 27 and ground and between windings 26 and 27 and winding 25 tends to produce an unsafe condition when the flame electrode 52 is grounded. The effect of such leakage capacities is to tend to maintain the detector B non-conductive when the flame electrode 52 is connected through a low resistance path to ground and thereby to maintain the amplifier V and relay 83 energized thus permitting the supply of fuel to the burner although the flame electrode 52 is grounded. More specifically, leakage capacities between either of the transformer secondary windings and ground operate to filter the pulsating potential produced across resistor 40 by winding 25 and rectifier A. Consequently, when the flame electrode 52 is grounded, such leakage capacities cause a negative potential to be applied to the control electrode 36 of the detector B. This effect is the same as that produced by a flame, and therefore, is an unsafe condition.

In Figs. 1 and 4 the tendency of such leakage capacity effects between the transformer secondary windings 26 and 27 and ground and between windings 26 and 27 and winding 25 to produce an unsafe condition when the flame electrode 52 is grounded has been obviated by properly choosing the resistance of the resistor 40. I have determined that when the resistance of the resistor 40 is relatively low compared to the leakage capacity effects likely to occur between the windings 26 and 27 and ground, for example, when the resistance of resistor 40 is of the order of 5000 ohms, it is impossible for leakage capacity effects of sufficient magnitude to affect the operation of the system to exist between the transformer secondary windings 26 and 27 and ground. Accordingly, in the arrangements of Figs. 1 and 4 a resistance 40 of 5000 ohms is utilized.

Figure 10:
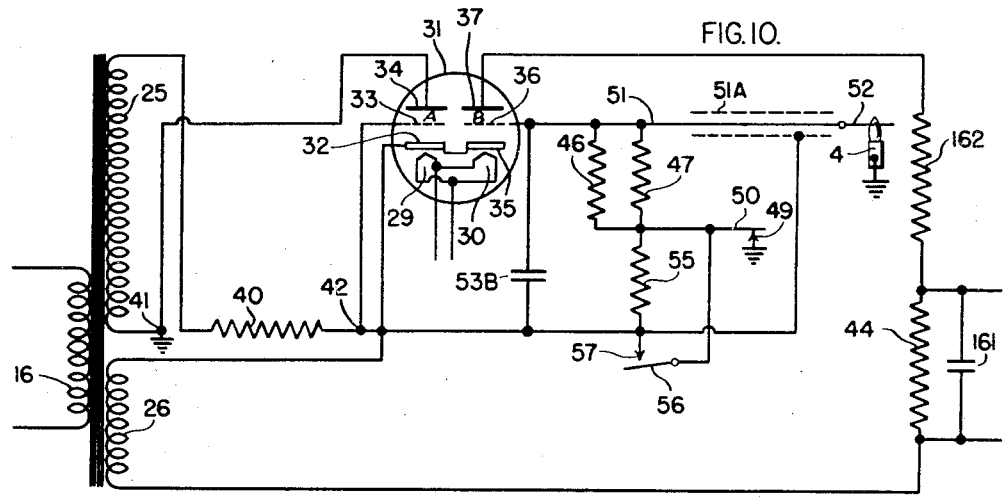
Fig. 10 is a wiring diagram of still another modification of the detector circuit of the arrangement of Fig. 1.

In Fig. 10 I have illustrated more or less diagrammatically a modification of the arrangement of Fig. 1 in which the effect of leakage capacities between the transformer secondary windings 26 and 27 has been eliminated in a different manner and thereby the possibility of unsafe failure of the system avoided. In Fig. 10, elements corresponding to those in the Fig. 1 arrangement have been designated by the same reference numerals.

As illustrated, the Fig. 10 modification differs in structure from the Fig. 1 arrangement mainly in that the rectifier A and resistor 40 have been interchanged with respect to the grounded terminal of transformer winding 25 and the rectifier A has been reversed so as to conduct on the same half cycle that the detector B is conductive. With this circuit arrangement the potential applied to the flame is a distorted alternating potential as illustrated in Fig. 11 whereas the potential applied to the flame in the Fig. 1 arrangement is a pulsating direct current potential.

Figure 11:
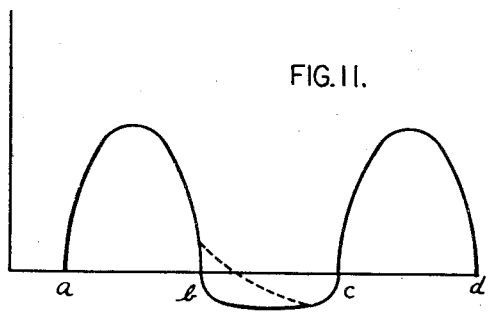
Fig. 11 is a curve illustrating the variation of cathode-control electrode potential in the input circuit of the detector of Fig. 10 during certain conditions of operation.

In Fig. 11 I have illustrated the approximate variation of the potential between the detector cathode 35 and control electrode 36 obtained in the Fig. 10 arrangement when the flame electrode 52 is connected to ground. In Fig. 11 the horizontal axis shows the passage of time and the vertical axis shows the potential applied between the cathode 35 and control electrode 36. The positive half waves $a$—$b$ and $c$—$d$ are due to the high potential difference between cathode 35 and ground when the rectifier A is non-conductive which is obtained at that time because substantially the whole potential of transformer winding 25 is then applied between cathode 35 and ground. The small half wave $b$—$c$ is due to the relatively small difference in potential between cathode 35 and ground during the half cycle when rectifier A is conductive since at that time most of the potential of transformer winding 25 is applied across resistor 40. This small potential tends to apply a positive potential on the control electrode 36 with respect to the cathode 35 and is of a magnitude sufficient to overcome any potential on the condenser in the input circuit of the detector existing because of leakage capacitance effects in the circuit, and tending to apply a negative potential to the control electrode 36. The wave form between points $b$ and $c$ when such a positive potential exists is shown by the dotted line in Fig. 11.

In Fig. 10 the condensers 53 and 54 of the Fig. 1 arrangement have been replaced by a single condenser 53B which is of relatively smaller capacity so that the time delay in the operation of the relay 83 in response to a change in conductivity between the flame electrode 52 and ground effected by the condenser 53B is negligible. In Fig. 10 time delay in the operation of the relay 83 in response to a change in the conductivity between the electrode 52 and ground is effected by a condenser 161 which is connected in parallel with the resistor 44. The effect of condenser 161 is to prevent immediate response of the amplifier V upon change in current flow through the resistor 44. The time of delay of that response is determined by the capacity of the condenser 161 and may be adjusted as desired by properly choosing condenser 161.

The modification of Fig. 10 incorporates a further desirable feature not obtained in the arrangement of Fig. 1. In the arrangement of Fig. 1 it has been found that disengagement of the electrode 52 from ground following a direct physical engagement of the electrode 52 with ground produces momentary energization of the relay 83. This energization of relay 83 continues for only a few seconds and is not objectionable in most cases, but in those instances where it may be objectionable, it may be avoided in the manner illustrated by Fig. 10 wherein a resistor 162 is provided between the resistance 44 and the anode 37 of the detector B. The effect of resistor 162 is to temporarily assume the full change in potential upon a change in the current flow through the resistors 162 and 44 so that substantially no change in potential of the control electrode 74 relatively to the cathode 73 of amplifier V is effected in response to a current surge through the resistances 44 and 162. In order to accomplish this desirable result it is noted that duration of the current surge through the resistors 44 and 162 must be less than the time delay of resistor 44 and condenser 161.

Figure 12:
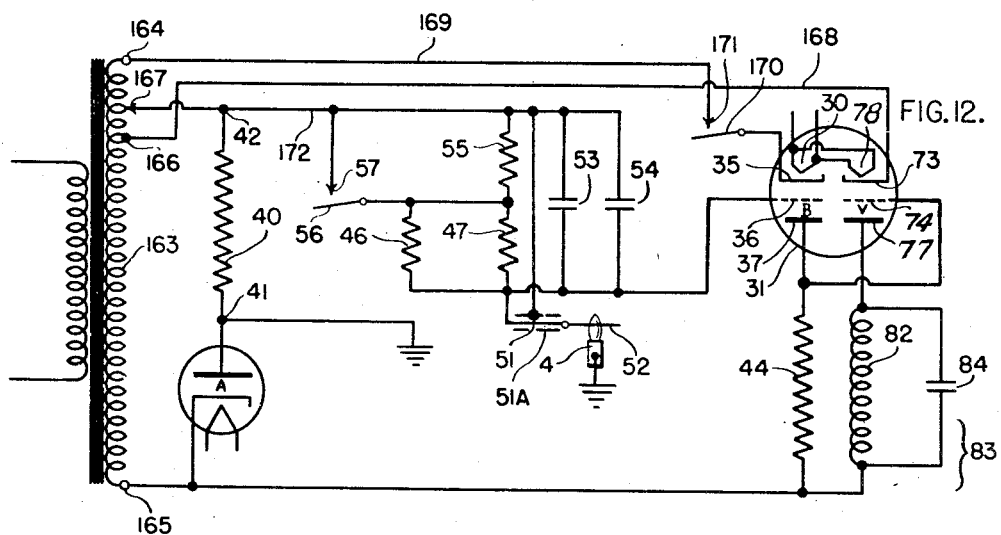

In Fig. 12 I have illustrated a modification of the arrangement of Fig. 1 wherein a different arrangement is shown for eliminating the undesirable leakage capacitance effects between the transformer secondary windings 25 and 26 and ground. In Fig. 12, a single transformer winding 163 having a number of taps intermediate its ends is employed in lieu of the separate transformer secondary windings 25, 26 and 27 of the Fig. 1 arrangement. In addition, in Fig. 12 the detector B and the amplifier V have been placed within a single envelope. The rectifier A has been shown separate from the detector B, and in this modification, may be of the copper oxide or any other suitable type. For convenience of illustration the rectifier A has been shown as a diode. Elements in Fig. 12 which correspond to those in Fig. 1 have been designated by the same reference numerals.

In Fig. 12 reference numeral 163 designates a transformer secondary winding having terminals 164 and 165, a fixed tap 166 and an adjustable tap 167. A portion of the winding between taps 165 and 167 supplies energizing voltage to the rectifier A. The portion of the winding between tap 166 and terminal 165 supplies energizing voltage to the amplifier V. The entire winding 163 is utilized to supply energizing voltage to the detector B.

The cathode 73 of the amplifier V is connected by a conductor 168 to the fixed tap 166. The tap 166 is at a positive potential with respect to the potential of the terminal 164 during the half cycle during which the detector B and the amplifier V are conductive. The cathode 35 of the detector B is connected to the terminal 164 by a conductor 169 in which a switch comprising an arm 170 and a contact 171 is inserted. In the arrangement of Fig. 12 the switch arm 170 and contact 171 are utilized instead of the switch arm 50 and contact 49 of the Fig. 1 arrangement. The switch arm 170 and contact 171 are provided for the same purpose that the switch arm 50 and contact 49 in Fig. 1 are provided, namely, for the purpose of initially permitting the relay 83 to become conductive upon closure of the thermostat blade 13 with the contact 14.

The adjustable tap 167 is connected to resistor 40 through a conductor 172. If the leakage capacitance effects are negligible it is noted that the tap 167 may be coincident with the terminal 164. If such effects are appreciable, however, the tap 167 may be moved along the transformer winding 163 until the potential difference between it and terminal 164 is sufficient to overcome any opposing potential obtained as a result of such leakage capacitance effect. That is to say, the tendency of leakage capacity effects between the transformer secondary winding and ground is to apply a negative potential to the control electrode 36 with respect to the potential of cathode 35 and can be eliminated by adjusting the tap 167 along winding 163. The effect of such adjustment is to introduce a potential in the cathode-control electrode circuit of detector B which is in opposition to the potential established on the control electrode 36 as a result of leakage capacitance between the transformer secondary winding 163 and ground and thereby eliminate the undesirable effects of such leakage capacitance.

In Fig. 13 I have shown a modification of the circuit of Fig. 12 wherein a different means is employed for eliminating the undesirable leakage capacitance effects previously described. The adjustable tap 167 of the Fig. 12 arrangement has been dispensed with, and terminal 42 of resistor 40 is connected permanently to terminal 164 of transformer winding 163. The leakage capacitance effects are eliminated in the present modification through the use of a resistor 172, connected between terminal 41 of the resistor 40 and terminal 165 of the transformer secondary winding 163. The resistance of resistor 172 is large with respect to that of resistor 40. As a result, the potential across resistor 40 and thereby the potential between control electrode 36 and cathode 35 of detector B when flame electrode 52 is grounded takes on the general wave form illustrated in Fig. 11. During the half cycles a—b and c—d, rectifier A is conductive, a large current flows through resistor 40, and the potential drop across its terminals is large. During the half cycle b—c, rectifier A is non-conductive, and current flows from the transformer through resistor 172 and resistor 40 in series. Since resistor 172 is larger than resistor 40, most of the transformer potential appears across the resistor 172, leaving a relatively small potential as shown between b and c in Fig. 11 to appear across resistor 40. By properly proportioning resistors 172 and 40, this potential may be made to assume any desired value.

In Fig. 14 I have shown a modification of the circuit of Fig. 1 which may be used where adverse conditions prevail which produce severe carbonization of the electrodes. In such cases, it is desirable to have a system which will distinguish between actual flame conditions and all other conductive paths to ground having comparable resistance. This end is accomplished, in this circuit, by making the detector circuit responsive primarily to the rectifying characteristic of the flame.

The rectifier A, in Fig. 14, is a triode whose control electrode 33 is connected through a conductor 173 to a terminal 174 of relay winding 82. Energizing voltage is supplied to rectifier A from that portion of the transformer winding 163 between terminal 165 and a tap 175. Detector B and amplifier V are both supplied from the transformer winding 163. The separate transformer winding 176 is used to bias amplifier V positively with respect to detector B so that the potential of detector anode 37 may be effective to control the conductivity of amplifier V. Since other means are provided in this circuit for distinguishing between high resistance grounds and actual flame conditions, resistor 55 is omitted. All other circuit elements are the same as in one or more of the circuits previously described, and have been designated by the same reference numerals.

The conductor 173 serves as a feed-back connection from the output circuit of amplifier V to the input circuit of rectifier A. Because of this connection, rectifier A is maintained non-conductive when amplifier V is non-conductive, and vice versa, in a manner to be explained hereinafter. When the burner is being started, rectifier A is, therefore, non-conductive, and detector B is conductive. In this modification alternating current is applied to the circuit path including the flame which may be traced from terminal 164 of winding 163, resistances 46 and 47 in parallel with condensers 53 and 54, conductor 51, flame electrode 52, the flame, and resistance 172 to terminal 165 of winding 163. Advantage is taken of the normal rectifying action of the flame to charge condensers 53 and 54 and reduce the output of detector B, thereby causing amplifier V and rectifier A to become slightly conductive. When rectifier A becomes slightly conductive, the charge on condensers 53 and 54 is increased, and the circuit action becomes cumulative until detector B is substantially cut off. Since this action cannot be initiated except by the rectifying action of a flame at electrode 52, the system will not start in operation until a flame appears, and is thus completely insensitive to the presence of a high resistance leakage path to ground at electrode 52.

Specifically, when amplifier V is non-conductive, there is no potential difference across the relay winding 82, and terminal 174 of the relay winding 82 is at substantially the same potential as terminal 164 of transformer winding 163. Control electrode 33, through its connection with terminal 174 assumes the same potential which is negative with respect to cathode 32, since the latter is connected to tap 175, and rectifier A is therefore non-conductive. When amplifier V is conductive, however, the potential drop across relay winding 82 opposes the potential difference between terminal 164 and tap 175 to the end that the potential of control electrode 33 becomes more positive with respect to cathode 32, and rectifier A becomes conductive. The rectifier A is, therefore, responsive to the condition of amplifier V, becoming conductive only when the amplifier is conductive.

If no flame exists at the flame electrode 52, control electrode 36 is substantially at cathode potential, and detector B is conductive. Amplifier V and rectifier A are therefore non-conductive, and the only potential between flame electrode 52 and the grounded burner 4 is that across resistor 40, which is due to the flow of current from secondary winding 163 through resistors 172 and 40 in series. When a flame appears between the burner and the electrode, its normal rectifying action allows more current to flow from the electrode to ground than in the opposite direction. This causes the condensers 53 and 54 to become charged so that the control electrode 36 becomes negative with respect to the cathode 35, the output of detector B decreases, and that of amplifier V and rectifier A increases. When rectifier A becomes conductive, it substantially short-circuits the resistor 40 during the half cycles when terminal 165 of the transformer winding 163 is positive. During the alternate half cycles, however, a large potential exists across resistor 40, and a current flows along the circuit branch parallel to resistor 40, through resistors 46 and 47 and condensers 53 and 54, flame electrode 52, the flame resistance, and ground. This pulsating current flow increases the charge on the condensers 53 and 54 so that the control electrode 36 becomes even more negative with respect to cathode 35. It is thus seen that the action of the circuit is cumulative, and that once the detector output is reduced by the flame rectification, it is reduced still further by the regenerative action of the amplifier on the rectifier.

It has been found that this circuit is not critical with respect to the position of the flame electrode 52 in the flame since when a flame is initiated the outer parts of the flame must touch the electrode first as the flame is propagated in the direction of the flame electrode. These outer parts rectify in the proper direction to reduce the detector output slightly, as explained above. Once that is done, the circuit response starts the rectifier operation, and biases the flame electrode 52 positively with respect to ground, making the circuit insensitive to flame electrode position.

The modification of Fig. 14 is particularly desirable in applications where severe carbonization of the flame electrode 52 or of the burner 4 is obtained in that the circuit response to leakage paths between the flame electrode and ground produced by such carbonization is minimized. That is to say, if the flame should become extinguished when a leakage path having an ohmic resistance of the order of the normal flame resistance exists, the negative potential applied on the control electrode 36 of detector B will be slightly decreased, and accordingly, the detector is rendered more conductive. This effects a reduction in the current conducted by amplifier V and thereby a reduction in the current conducted by rectifier A. That reduction in rectifier current results in a decrease in the direct current voltage applied between the flame electrode and ground and thereby in a further increase in conductivity of detector B because of the reduction in potential drop across resistances 46 and 47 produced as a result of the direct current voltage decrease. This effect is, therefore, seen to be a regenerative one, and accordingly, after a predetermined period determined by the circuit constants, the relay 83 will be deenergized and thereby the system shut down.

While in accordance with the provisions of the statutes I have illustrated and described preferred embodiments of the present invention, those skilled in the art will understand that changes may be made in the form of the apparatus disclosed without departing from the spirit of my invention as set forth in the appended claims, and that some features of the present invention may sometimes be used with advantage, without a corresponding use of other features.

Having now described my invention, what I claim as new and desire to secure by Letters Patent, is:

1. An electric circuit for controlling a load device in accordance with the magnitude of a variable impedance element, comprising a load device, a variable impedance element, an energizing circuit adapted to be connected to a source of alternating current of predetermined frequency, an electric discharge rectifier device having an input circuit including said impedance element and an output circuit, a connection between said load device and said output circuit including said energizing circuit, and means for intermittently impressing a substantially unidirectional potential of constant magnitude and of the same frequency as said alternating current across said impedance element during the half cycles of said alternating current when said discharge rectifier device is non-conductive.

2. An electric circuit for controlling a load device in accordance with the impedance of a flame, comprising in combination, a pair of spaced electrodes insulated from each other and adapted to be engaged by a flame, an energizing circuit adapted to be connected to a source of alternating current of predetermined frequency, an electric discharge rectifier device having an input circuit including said flame electrodes and an output circuit, a load device, a connection between said load device and said output circuit including said energizing circuit, and means for intermittently impressing a substantially unidirectional potential across said electrodes during the half cycles of said alternating current when said discharge rectifier device is non-conductive.

3. The combination of claim 2 wherein one of said electrodes engages the outer part of said flame, and the other electrode engages the base of said flame, and wherein the polarity of said potential is such that the outer electrode is positive with respect to the base electrode.

4. An electric circuit for operating a load device in accordance with the impedance of a flame, comprising in combination, a first electrode adapted to engage the outer part of a flame, a second electrode spaced and insulated from said first electrode and adapted to engage the base of the same flame the outer part of which is adapted to be engaged by said first electrode, an energizing circuit adapted to be connected to a source of alternating current of predetermined frequency, a load device, an electric discharge device having an anode, a cathode, and a control electrode, a connection between said anode, said cathode and said load device including said energizing circuit which is conductive only during the half cycles when said anode is positive, a connection for regulating the potential of said control electrode including said flame electrodes and a capacitive impedance connected between said control electrode and said cathode, and means for impressing on said last mentioned connection an intermittent unidirectional potential of the same frequency as said alternating current adapted to be supplied to said energizing circuit, said potential having a polarity such that said first electrode is positive with respect to said second electrode, and having a phase opposite to that of the half cycles during which said first mentioned connection is conductive.

5. A safety control system for a fuel burner, including in combination, electrical control means having two alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of alternating current of predetermined frequency, an electric discharge rectifier device having an input circuit including said flame electrodes and an output circuit, a connection between said control means and said energizing circuit including said output circuit, and means for intermittently impressing a substantially unidirectional potential across said electrodes during the half cycles of said alternating current when said discharge rectifier device is non-conductive.

6. A safety control system for a fuel burner including in combination, electrical control means having alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, a capacitance and a resistance connected in parallel in said input circuit, a resistor, a rectifying device connecting said resistor to said energizing circuit to produce an intermittent unidirectional potential across said resistor, means to impress the potential produced across said resistor on the input circuit of said discharge device through said flame, a second resistor, a connection between said second mentioned resistor and said energizing circuit including said output circuit, and a second electric discharge device having an input circuit including said second mentioned resistor and an output circuit including said control means and said energizing circuit.

7. An electric circuit for operating a load device in accordance with the magnitude of an impedance element, comprising in combination, a load device, a variable impedance element, an energizing circuit adapted to be connected to a source of alternating current, an electric discharge rectifier device having an output circuit and an input circuit, a connection between said energizing circuit and said load device including said output circuit, a connecton between said impedance element and said input circuit, and means for impressing a fluctuating, substantially unidirectional potential of regular wave form of the same frequency as said alternating current and of substantially constant amplitude of fluctuation across said impedance during the half cycles of said alternating current when said discharge rectifier device is non-conductive, said means being operative to prevent objectionable distortion of said wave form due to leakage capacitance between said energizing circuit and said means.

8. The combination of claim 7 wherein said means comprise a half wave rectifier and a resistor connected in series to said energizing circuit, said resistor having such a value as to prevent objectionable distortion of said wave form due to leakage capacitance between said energizing circuit and said means.

9. The combination of claim 7 wherein said means comprise a half wave rectifier and a resistor connected in series to said energizing circuit, and a direct connection between the positive terminal of said rectifier and a terminal of said impedance element.

10. A safety control system for a fuel burner including in combination, electrical control means having alternate control conditions dependent upon the flow of electric current therethrough, one of said conditions permitting production of a flame at said burner, and the other of said conditions preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, a capacitance and a resistance connected in parallel in said input circuit, a resistor, a rectifying device connecting said resistor to said energizing circuit to produce a pulsating unidirectional potential across said resistor, a pair of electrostatically linked conductors to impress the potential produced across said resistor on the input circuit of said discharge device through said flame, said capacitance having a value of at least 0.0075 microfarads and at least five times that of the distributed capacitance between said electrostatically linked conductors, a second resistor, a connection between said second mentioned resistor and said energizing circuit including said output circuit, and a second electric discharge device having an input circuit including said second mentioned resistor and an output circuit including said control means and said energizing circuit.

11. A safety control system for a fuel burner, including in combination, electrical control means having two alternative control conditions dependent upon the flow of electric current therethrough, one of said conditions permitting production of a flame at said burner and the other condition preventing production of a flame at said burner, a pair of spaced electrodes insulated from each other and engaging said flame, an energizing circuit adapted to be connected to a source of electrical current, an electric discharge device having an input circuit and an output circuit, a connection between said control means and said energizing circuit including said output circuit, said flame electrodes being remotely located from said discharge device and connected to said input circuit by conductors having distributed capacitance, and a condenser connected in said input circuit to oppose the effect of said distributed capacitance, said condenser having a capacitance of at least 0.0075 microfarads and at least five times that of said distributed capacitance.

12. The combination of claim 11, wherein means is provided to impress a potential of rectified half waves across said flame electrodes.

13. The combination of claim 11, wherein one of said flame electrodes normally engages the outer part of said flame, and the other engages its base, and wherein means is provided to impress a varying, substantially unidirectional potential across said electrodes, and wherein the polarity of said potential is such that he outer electrode is positive with respect to the base electrode.

14. A safety control system for a fuel burner, including in combination, electrical control means having two alternative control conditions dependent upon the flow of electric current therethrough, one of said conditions permitting production of a flame at said burner and the other condition preventing production of a flame at said burner, a pair of spaced electrodes insulated from each other and engaging said flame, an electric discharge device having an input circuit and an output circuit, an energizing circuit adapted to be connected to a source of alternating voltage, a connection between said control means and said energizing circuit including said output circuit, said flame electrodes being remote from said discharge device and connected to said input circuit by conductors having distributed capacitance therebetween, and means connected in circuit with said energizing circuit to impress in series with said flame electrodes, said conductors and said input circuit an intermittent unidirectional voltage of constant magnitude and of the same frequency as the alternating voltage to which said energizing circuit is adapted to be connected.

15. An electric circuit including a load device, an electric discharge rectifier device having an input circuit and an output circuit for controlling said load device in accordance with the magnitude of a variable impedance element remote from said discharge rectifier device, an energizing circuit adapted to be connected to a source of alternating current, electrostatically linked conductors connecting said impedance element to the input circuit of said discharge device, a connection between said load device and the output circuit of said discharge rectifier device including said energizing circuit, and means for intermittently impressing a current through said conductors and impedance element during the half cycles of said alternating current when said discharge rectifier device is non-conductive.

16. The combination of claim 15 wherein the input circuit of said electric discharge device includes a condenser having a capacitance of such value that the ratio of the distributed capacitance between said electrostatically linked conductors to the capacitance of said condenser is small.

17. The combination of claim 15 wherein the input circuit of said electric discharge device includes a condenser having a capacitance of at least .0075 microfarads and at least five times that between said conductors.

18. The combination of claim 15 wherein the input circuit of said electric discharge device includes a condenser and a resistance connected in parallel, said condenser having a capacitance of such value that the ratio of the distributed capacitance between said electrostatically linked conductors to the capacitance of said condenser is small.

19. An electric circuit including a load device, an electric discharge device having an input circuit and an output circuit for controlling said load device in accordance with the magnitude of a variable impedance element remote from said discharge device, an energizing circuit adapted to be connected to a source of electrical energy, electrostatically linked conductors connecting said impedance element to the input circuit of said discharge device, a parallel connected condenser and resistor connected between said conductors, a connection between said load device and the output circuit of said discharge device including said energizing circuit, and means for impressing a fluctuating current through said conductors, said parallel connected condenser and resistor, and said impedance element in series.

20. An electric circuit including a load device, an electric discharge rectifier device having an input circuit and an output circuit for controlling said load device in accordance with the magnitude of a variable impedance element remote from said discharge device, an energizing circuit adapted to be connected to a source of alternating current, electrostatically linked conductors connecting said impedance element to the input circuit of said discharge device, a connection between said load device and the output circuit of said discharge device including said energizing circuit, and means for intermittently impressing a unidirectional current through said conductors and impedance element during the half cycles of said alternating current when said discharge rectifier device is non-conductive.

21. An electric circuit for controlling a load device in accordance with the magnitude of a variable impedance element having a capacitive component, comprising an energizing circuit adapted to be connected to a source of energy, an electric discharge device having an input circuit including said impedance element and an output circuit, a condenser in said input circuit having a capacitance of at least 0.0075 microfarads and at least five times that of said capacitive component, a connection between said load device and said output circuit including said energizing circuit, and means for impressing an intermittent, substantially unidirectional potential of constant magnitude and frequency across said impedance element.

22. An electric circuit including in combination, an impedance element having a capacitive component and a resistive component, a load device to be controlled in accordance with the magnitude of said resistive component, an energizing circuit adapted to be connected to a source of electrical energy, an electric discharge device having an input circuit including said impedance element and an output circuit, a connection between said output circuit and said load device including said energizing circuit, and a condenser in said input circuit to reduce the effect of the capacitive component of said impedance element upon said input circuit, said condenser having a capacitance of at least 0.0075 microfarads and at least five times that of the capacitive component of said impedance element.

23. An electric circuit including a load device, an electric discharge device having a single input circuit and a single output circuit for controlling said load device in accordance with the magnitude of the resistance of a flame remote from said discharge device, an energizing circuit adapted to be connected to a source of electrical energy, electrostatically linked conductors adapted to connect a flame to the input circuit of said discharge device, a connection between said load device and the output circuit of said discharge device including said energizing circuit, and means for impressing an intermittent current through said conductors and flame resistance.

24. The combination of claim 23 wherein said last mentioned means impress a pulsating unidirectional current through said conductors and flame resistance.

25. The combination of claim 23 wherein a parallel connected condenser and resistor are connected between said conductors in the input circuit of said discharge device.

26. An electric circuit for operating a load device in accordance with the impedance of a flame, comprising in combination, a pair of spaced electrodes insulated from each other and adapted to be engaged by a flame, an energizing circuit adapted to be connected to a source of electrical energy, a load device, an electric discharge device located remote from a flame and having an anode, a cathode, and a control electrode, a connection between said anode, said cathode and said load device including said energizing circuit, and means for regulating the potential of said control electrode with respect to said cathode, comprising a conductor having distributed capacitance to ground to connect said control electrode with one of said flame electrodes, a condenser connected between said control electrode and said cathode to reduce the effect of said distributed capacitance upon the potential of said control electrode, said condenser having a capacitance of at least 0.0075 microfarads and at least five times that of said distributed capacitance.

27. In a control system a plurality of burner means adapted to cooperate with a plurality of variable conditions, each condition adapted to be modified by a respective one of said burner means, each of said conditions normally varying over a predetermined intermediate range of values and abnormally adapted to assume two widely displaced values, means for controlling said first mentioned means in one sense to maintain said conditions within said predetermined range of values and in another sense upon the occurrence of one or more of said conditions assuming one of said widely displaced values, an electric discharge device having an input circuit and an output circuit, electrical circuit means including the output circuit of said electric discharge device to control said second mentioned means, an electric discharge device associated with each of said burner means, each of said last mentioned electric discharge devices having an input circuit and an output circuit, a capacitance and a resistance connected in parallel in each of the input circuits of said last mentioned electric discharge devices, a resistor, means including a rectifying device to produce a pulsating unidirectional potential across said resistor, means to impress the pulsating potential produced across said resistor on the input circuit on each of said last mentioned discharge devices under control of the variable condition associated with the discharge device individual thereto, and means connected in the output circuits of all of said last mentioned discharge devices and in the input circuit of said first mentioned discharge device to control the operation of said first mentioned discharge device as required to actuate said second mentioned means in said one sense when the values of all of said conditions are within said intermediate range of values and in said other sense when the values of one or more of said conditions are one or the other of said widely displaced values.

28. In a control system a plurality of burner means adapted to cooperate with a plurality of variable conditions, each condition adapted to be modified by a respective one of said burner means, each of said conditions normally varying over a predetermined intermediate range of values and abnormally adapted to assume two widely displaced values, control means adapted to be actuated in one sense when all of said conditions are within said predetermined range of values and adapted to be actuated in another sense upon the occurrence of one or more of said conditions assuming one of said widely displaced values, signalling means controlled by said control means, an electric discharge device having an input circuit and an output circuit, electrical circuit means including the output circuit of said electric discharge device to control said second mentioned means, an electric discharge device associated with each of said burner means, each of said last mentioned electric discharge devices having an input circuit and an output circuit, a capacitance and a resistance connected in parallel in each of the input circuits of said last mentioned electric discharge devices, a resistor, means including a rectifying device to produce a pulsating unidirectional potential across said resistor, means to impress the pulsating potential produced across said resistor on the input circuit of each of said last mentioned discharge devices under control of the variable condition associated with the discharge device individual thereto, means connected in the output circuits of all of said last mentioned discharge devices and in the input circuit of said first mentioned discharge device to control the operation of said first mentioned discharge device as required to actuate said second mentioned means in said one sense when the values of all of said conditions are within said intermediate range of values and in said other sense when the values of one or more of said conditions are one or the other of said widely displaced values, and signalling means connected in the output circuits of each of the electric discharge devices associated with each of said burner means to indicate which of said conditions have assumed one or the other of said widely displaced values.

29. In a control system a plurality of burner means adapted to cooperate with a plurality of variable conditions, each condition adapted to be modified by a respective one of said burner means, each of said conditions normally varying over a predetermined intermediate range of values and abnormally adapted to assume two widely displaced values, control means adapted to be actuated in one sense when all of said conditions are within said predetermined range of values and adapted to be actuated in another sense upon the occurrence of one or more of said conditions assuming one of said widely displaced values, signalling means controlled by said control means, an electric discharge device having an input circuit and an output circuit, electrical circuit means including the output circuit of said electric discharge device to control said second mentioned means, an electric discharge device associated with each of said burner means, each of said last mentioned electric discharge devices having an input circuit and an output circuit, a capacitance and a resistance connected in parallel in each of the input circuits of said last mentioned electric discharge devices, a resistor, means including a rectifying device to produce a pulsating unidirectional potential across said resistor, means to impress the pulsating potential produced across said resistor on the input circuit of each of said last mentioned discharge devices under control of the variable condition associated with the discharge device individual thereto, and means connected in the output circuits of all of said last mentioned discharge devices and in the input circuit of said first mentioned discharge device to control the operation of said first mentioned discharge device as required to actuate said second mentioned means in said one sense when the values of all of said conditions are within said intermediate range of values and in said other sense when the values of one or more of said conditions are one or the other of said widely displaced values.

30. A safety control system for a fuel burner including in combination, electrical control means having alternate control conditions dependent upon the flow of electric current therethrough, one of said conditions permitting production of a flame at said burner, and the other of said conditions preventing production of a flame at said burner, a pair of spaced electrodes insulated from each other and engaging said flame, one of said electrodes being grounded, an energizing circuit adapted to be connected to a source of electrical energy, an electric discharge device having an input circuit including said flame electrodes and an output circuit, a capacitance and a resistance connected in parallel in said input circuit, said capacitance being comprised of at least two condensers connected in parallel and said resistance being comprised of at least two resistors connected in parallel, a resistor, a rectifying device connecting said resistor to said energizing circuit to produce a pulsating unidirectional potential across said resistor, a connection from one terminal of said resistor to ground, a conductor shielded from ground connected from the other terminal of said resistor to the flame electrode which is insulated from ground to impress the potential produced across said resistor on the input circuit of said discharge device through said flame, a second resistor, a connection between said second mentioned resistor and said energizing circuit including said output circuit, and a second electric discharge device having an input circuit including said second mentioned resistor and an output circuit including said control means and said energizing circuit.

31. A safety control system for a fuel burner including in combination, electrical control means having two alternative control conditions dependent upon the flow of electric current therethrough, one of said conditions permitting production of a flame at said burner and the other condition preventing production of a flame at said burner, a pair of spaced electrodes insulated from each other and engaging said flame, an energizing circuit adapted to be connected to a source of alternating current, an electric discharge device having an input circuit and an output circuit, a connection between said control means and said energizing circuit including said output circuit, a second electric discharge device having an input circuit and an output circuit, a connection between the input circuit of said first mentioned discharge device and said energizing circuit including the output circuit of said second mentioned discharge device, the output circuit of said second mentioned discharge device being so connected in said second mentioned connection as to be conductive on the alternate half cycles when said first mentioned discharge device is non-conductive, said flame electrodes being remotely located from said discharge devices and connected to the input circuit of said second mentioned discharge device by conductors having distributed capacitance, and a condenser connected in the input circuit of said second mentioned discharge device to oppose the effect of said distributed capacitance, said condenser being large in value compared to the value of said distributed capacitance.

32. A safety control system for a fuel burner including in combination, electrical control means having alternate control conditions dependent upon the flow of electric current therethrough, one of said conditions permitting production of a flame at said burner, and the other of said conditions preventing production of a flame at said burner, a pair of spaced electrodes iinsulated from each other and engaging said flame, an energizing circuit adapted to be connected to a source of electrical energy, an electric discharge device having an input circuit including said flame electrodes and an output circuit, a capacitance and a resistance connected in parallel in said input circuit, a resistor, a rectifying device connecting said resistor to said energizing circuit to produce a pulsating unidirectional potential across said resistor, means to impress the potential produced across said resistor on the input circuit of said discharge device through said flame, adjustable means to impress a potential on the input circuit of said discharge device to neutralize the effects of leakage capacitance between said energizing circuit and ground, a second resistor, a connection between said second mentioned resistor and said energizing circuit including said output circuit, and a second electric discharge device having an input circuit including said second mentioned resistor and an output circut including said control means and said energizing circuit.

33. A safety control system for a fuel burner including in combination, electrical control means having alternate control conditions dependent upon the flow of electric current therethrough, one of said conditions permitting production of a flame at said burner, and the other of said conditions preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, a capacitance and a resistance connected in parallel in said input circuit, a resistor, a rectifying device connecting said resistor to said energizing circuit to produce a potential across said resistor, a second resistor connected in shunt to said rectifying device, said second resistor being of a substantially larger value than said first mentioned resistor, means to impress the potential produced across said first mentioned resistor on the input circut of said discharge device through said flame, a third resistor, a connection between said third mentioned resistor and said energizing circuit including said output circuit, and a second electric discharge device having an input circuit including said third mentioned resistor and an output circuit including said control means and said energizing circuit.

34. A safety control system for a fuel burner including in combination, electrical control means having two alternative control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of alternating electrical energy, a first electric discharge device having an output circuit and an input circuit including said flame electrodes, a connection between said control means and said energizing circuit including said output circuit, a connection between said input circuit and said energizing circuit for impressing an alternating potential across said flame electrodes, and a second electric discharge device having an output circuit and an input circuit, said last mentioned output circuit being connected to said energizing circuit and to said flame electrodes for impressing an interrupted unidirectional potential thereacross, and said last mentioned input circuit including said control means.

35. A safety control system for a fuel burner, including in ocmbination, electrical control means having two alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, said flame electrodes being remotely located from said discharge device and connected to the input circuit thereof by conductors having distributed capacitance, a condenser included in the input circuit of said discharge device to oppose the effect of said distributed capacitance, said condenser having a capacitance of at least 0.0075 microfarads and at least five times that of said distributed capacitance, a connection between said control means and said energizing circuit including said output circuit, and means for impressing a fluctuating substantially unidirectional potential across said electrodes.

36. A safety control system for a fuel burner including in combination, electrical control means having alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, a capacitance and a resistance connected in parallel in said input circuit, a resistor, a rectifying device connecting said resistor to said energizing circuit to produce a pulsating unidirectional potential across said resistor, means to impress the potential produced across said resistor on the input circuit of said discharge device through said flame, a second resistor, a connection between said second mentioned resistor and said energizing circuit including said output circuit, a second electric discharge device having an input circuit including said second mentioned resistor and an output circuit including said control means and said energizing circuit, said rectifying device and each of said discharge devices including a heater filament, means to connect the heater filament of said rectifying device and said first mentioned discharge device in parallel, and means to connect said parallel connected heater filaments in series with the heater filament of said second mentioned discharge device to said energizing circuit.

37. A safety control system for a fuel burner including in combination, electrical control means having alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, a capacitance and a resistance connected in parallel in said input circuit, said capacitance being comprised of at least two condensers connected in parallel, a resistor, a rectifying device connecting said resistor to said energizing circuit to produce a pulsating unidirectional potential across said resistor, means to impress the potential produced across said resistor on the input circuit of said discharge device through said flame, a second resistor, a connection between said second mentioned resistor and said energizing circuit including said output circuit, and a second electric discharge device having an input circuit including said second mentioned resistor and an output circuit including said control means and said energizing circuit.

38. A safety control system for a fuel burner including in combination, electrical control means having alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of electrical energy, an electric discharge device having an input circuit including said flame electrodes and an ouptput circuit, a capacitance and a resistance connected in parallel in said input circuit, said resistance being comprised of at least two resistors connected in parallel, a third resistor, a rectifying device connecting said third resistor to said energizing circuit to produce a pulsating unidirectional potential across said third resistor, means to impress the potential produced across said third resistor on the input circuit of said discharge device through said flame, a fourth resistor, a connection between said fourth resistor and said energizing circuit including said output circuit, and a second electric discharge device having an input circuit including said fourth resistor and an output circuit including said control means and said energizing circuit.

39. A safety control system for a fuel burner including in combination, electrical control means having alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, a capacitance and a resistance connected in parallel in said input circuit, said capacitance being comprised of at least two condensers connected in parallel and said resistance being comprised of at least two resistors connected in parallel, a third resistor, a rectifying device connecting said third resistor to said energizing circuit to produce a pulsating unidirectional potential across said third resistor, means to impress the potential produced across said third resistor on the input circuit of said discharge device through said flame, a fourth resistor, a connection between said fourth resistor and said energizing circuit including said output circuit, and a second electric discharge device having an input circuit including said fourth resistor and an output circuit including said control means and said energizing circuit.

40. A safety control system for a fuel burner including in combination, electrical control means having alternate control conditions dependent upon the flow of electric current therethrough, one of said conditions permitting production of a flame at said burner, and the other condition preventing production of a flame at said burner, a pair of spaced electrodes insulated from each other and engaging said flame, an energizing circuit adapted to be connected to a source of electrical energy, an electric discharge device having an input circuit including said flame electrodes and an output circuit, a capacitance and a resistance connected in parallel in said input circuit, said capacitance being comprised of at least two condensers connected in parallel and said resistance being comprised of at least two resistors connected in parallel, a third resistor, a rectifying device connecting said third resistor to said energizing circuit to produce a pulsating unidirectional potential across said third resistor, means to impress the potential produced across said third resistor on the input circuit of said discharge device through said flame, a fourth resistor, a connection between said fourth resistor and said energizing circuit including said output circuit, a second electric discharge device having an input circuit including said fourth resistor and an output circuit including said control means and said energizing circuit, said rectifying device and each of said discharge devices including a heater filament, means to connect the heater filaments of said rectifying device and said first mentioned discharge device in parallel, and means to connect said parallel connected heater filaments in series with the heater filament of said second mentioned discharge device to said energizing circuit.

41. An electric circuit for selectively controlling a load device in one sense or in another sense accordingly as the magnitude of a variable impedance element is either of two widely displaced values or is an intermediate value, comprising an energizing circuit adapted to be connected to a source of alternating current of predetermined frequency, a second impedance element, an electric discharge rectifier device having input terminals between which said second impedance element is connected and having an output circuit, a connection between said load device and said output circuit including said energizing circuit, and means for intermittently impressing on said second impedance element through said variable impedance element a substantially unidirectional potential of constant magnitude and of the same frequency as said alternating current during the half cycles of said alternating current when said discharge rectifier device is non-conductive.

42. An electric circuit for selectively controlling a load device in one sense or in another sense accordingly as the magnitude of a variable impedance element is either of two widely displaced values or is an intermediate value, comprising an energizing circuit adapted to be connected to a source of alternating current of predetermined frequency, a second impedance element, an electric discharge rectifier device having input terminals between which said second impedance element is connected and having an output circuit, a connection between said load device and said output circuit including said energizing circuit, and means for intermittently impressing a fluctuating current through said variable impedance element and said second impedance element in series.

HARRY S. JONES.

REFERENCES CITED

The following references are of record in the file of this patent:

UNITED STATES PATENTS

| Number | Name | Date |
| --- | --- | --- |
| 1,902,552 | Fulton | Mar. 21, 1933 |
| 2,029,421 | Green | Feb. 4, 1936 |
| 2,136,256 | Sweet | Nov. 8, 1938 |
| 2,147,472 | Ulrey | Feb. 14, 1939 |
| 2,175,017 | Cockrell | Oct. 3, 1939 |
| 2,224,119 | Harrison | Dec. 3, 1940 |
| 2,231,420 | Gillie | Feb. 11, 1941 |
| 2,243,071 | Crago | May 27, 1941 |
| 2,245,730 | Sparrow | June 17, 1941 |
| 2,252,002 | Halsey | Aug. 12, 1941 |
| 2,260,977 | Jones | Oct. 28, 1941 |
| 2,299,501 | Schneider | Oct. 20, 1942 |